United States Patent
Kobayashi et al.

(10) Patent No.: US 11,519,756 B2
(45) Date of Patent: Dec. 6, 2022

(54) ROTATION DETECTION DEVICE HAVING DETECTOR AND SIGNAL PROCESSOR

(71) Applicant: DENSO CORPORATION, Kariya (JP)

(72) Inventors: Atsushi Kobayashi, Kariya (JP); Michihiro Makita, Kariya (JP); Yusuke Kariya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/331,722

(22) Filed: May 27, 2021

(65) Prior Publication Data
US 2021/0285797 A1    Sep. 16, 2021

Related U.S. Application Data

(63) Continuation of application No. PCT/JP2019/049726, filed on Dec. 19, 2019.

(30) Foreign Application Priority Data

Jan. 14, 2019 (JP) ............................. JP2019-003975

(51) Int. Cl.
G01D 5/245    (2006.01)
(52) U.S. Cl.
CPC ................................. G01D 5/245 (2013.01)
(58) Field of Classification Search
CPC ................... G01D 5/12–2525; G01D 2205/85
See application file for complete search history.

(56) References Cited

U.S. PATENT DOCUMENTS

| 2006/0197480 | A1* | 9/2006 | Mori | ......................... | H02P 6/16 |
| | | | | | 318/400.04 |
| 2013/0257417 | A1* | 10/2013 | Ely | ....................... | G01D 5/2013 |
| | | | | | 324/207.22 |
| 2014/0375312 | A1* | 12/2014 | Friedrich | ............... | G01R 33/09 |
| | | | | | 324/259 |
| 2015/0115941 | A1* | 4/2015 | Shimauchi | ............. | G01D 5/145 |
| | | | | | 324/207.25 |
| 2015/0354987 | A1* | 12/2015 | Kusumi | ................... | G01D 5/16 |
| | | | | | 324/207.21 |

(Continued)

FOREIGN PATENT DOCUMENTS

| JP | 51-151568 A | 12/1976 |
| JP | 2017-009411 A | 1/2017 |

(Continued)

*Primary Examiner* — Huy Q Phan
*Assistant Examiner* — David B Frederiksen
(74) *Attorney, Agent, or Firm* — Posz Law Group, PLC

(57) ABSTRACT

A rotation detection device includes: a detector arranged with a gap to a rotating body in which rotation position information is periodically provided at regular intervals, and detecting a magnetic change as a rotation position of the rotating body; and a signal processor acquiring the rotation position information. The detector has first and second magnetic elements arranged with an interval of a/2 in a rotation direction. Each regular interval is defined as a. The first magnetic element outputs a first signal having a period corresponding to the regular intervals. The second magnetic element outputs a second signal having an opposite phase to the first signal and the period. The signal processor acquires a differential signal between the first and second signals as the rotation position information.

21 Claims, 16 Drawing Sheets

(56) References Cited

U.S. PATENT DOCUMENTS

2016/0041010 A1\* 2/2016 Hara .................. G01D 5/244
  324/207.13
2019/0353677 A1\* 11/2019 Lim .................. G01P 13/045

FOREIGN PATENT DOCUMENTS

JP         6337842 B2 \*  6/2018
JP         6337842 B2     6/2018

\* cited by examiner

S5:2B-A-C
S6:A-R

S7:2B-A-C
S8:L-C

ROTATION DETECTION DEVICE HAVING DETECTOR AND SIGNAL PROCESSOR

CROSS REFERENCE TO RELATED APPLICATION

The present application is a continuation application of International Patent Application No. PCT/JP2019/049726 filed on Dec. 19, 2019, which designated the U.S. and claims the benefit of priority from Japanese Patent Application No. 2019-003975 filed on Jan. 14, 2019. The entire disclosures of all of the above applications are incorporated herein by reference.

TECHNICAL FIELD

The present disclosure relates to a rotation detection device.

BACKGROUND

Conventionally, for example, as a conceivable device, a rotation detection device detects the rotation of a rotating body in which rotation position information is periodically provided on the outer peripheral portion at regular intervals. Specifically, the rotation detection device includes a detection unit that generates a main signal corresponding to the output of a plurality of magnetic detection elements accompanying the rotation of the rotating body, and a sub signal having a phase with respect to the main signal, respectively.

Further, the rotation detection device includes a determination circuit unit that compares the main signal with the binarization threshold value to generate a position signal obtained by binarizing the main signal, and compares the sub signal with the binarization threshold value to generate a phase signal obtained by binarizing the sub signal. The determination circuit unit defines the position signal as the rotation position information of the rotating body, and the phase signal as the rotation mode information of the rotating body.

SUMMARY

A rotation detection device includes: a detector arranged with a gap to a rotating body in which rotation position information is periodically provided at regular intervals, and detecting a magnetic change as a rotation position of the rotating body; and a signal processor acquiring the rotation position information. The detector has first and second magnetic elements arranged with an interval of a/2 in a rotation direction. Each regular interval is defined as a. The first magnetic element outputs a first signal having a period corresponding to the regular intervals. The second magnetic element outputs a second signal having an opposite phase to the first signal and the period. The signal processor acquires a differential signal between the first and second signals as the rotation position information.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
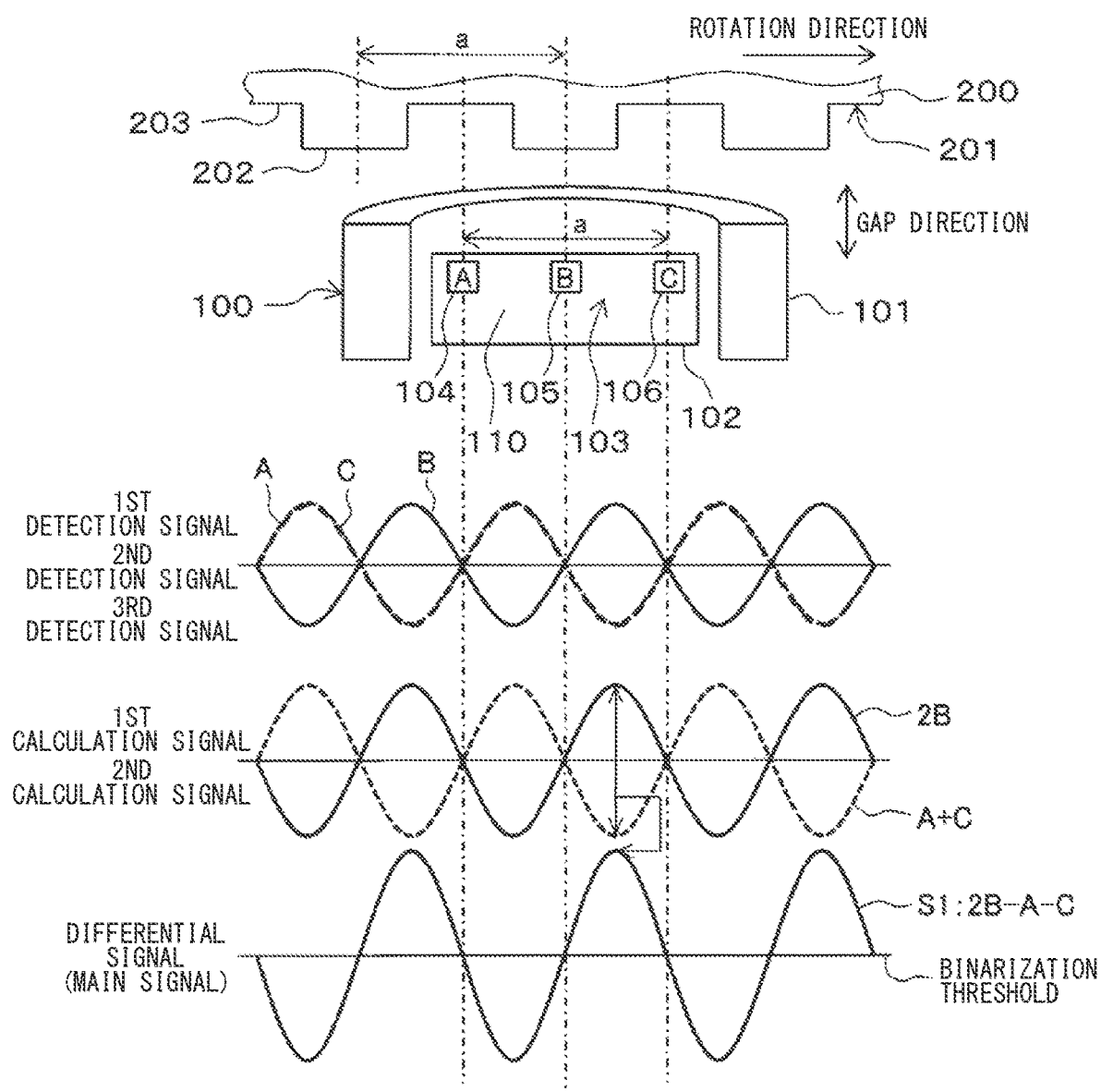
FIG. 1 is a diagram showing an arrangement relationship between a rotation detection device and a gear and each signal according to the first embodiment.

In recent years, in response to demands for miniaturization and weight reduction of rotating bodies, regular intervals of rotating position information have become narrower. When the regular interval of the rotation position information in the rotating body is narrowed, the magnetic change received by the detection unit from the outer peripheral portion of the rotating body becomes small. Therefore, the detectability of the detection unit is lowered.

Therefore, it is conceivable to reduce the gap between the rotating body and the detection unit. However, in order to avoid the influence of the vibration of the rotating body and the vibration of the structure for fixing the rotation detection device, it is necessary to secure a gap between the rotating body and the detection unit.

In view of the above points, a rotation detection device is capable of securing a detectable gap with respect to a rotating body even when a regular interval of rotation position information in the rotating body is narrowed.

The rotation detection device according to the present embodiments includes a detection unit and a signal processing unit. The detection unit is arranged with a predetermined gap with respect to the outer peripheral portion of the rotating body in which the rotation position information is periodically provided on the outer peripheral portion at regular intervals. The detection unit detects the magnetic change received from the outer peripheral portion as the rotation position of the rotating body changes due to the rotation of the rotating body. The signal processing unit acquires the rotation position information of the rotating body based on the detection result of the detection unit.

According to the first aspect of the present embodiments, the detection unit includes a first magnetic element and a second magnetic element. When a constant interval is defined as a, the first magnetic element and the second magnetic element are arranged with an interval of a/2 in the rotation direction of the rotating body. The first magnetic element outputs a first signal having the same period as a constant interval. The second magnetic element outputs a second signal having the opposite phase to the first signal and having the same period at the constant interval. The signal processing unit acquires the differential signal between the first signal and the second signal as rotation position information having the same period as a constant interval.

According to this, since the first magnetic element and the second magnetic element are arranged with an interval of a/2, the first signal and the second signal can be acquired as signals having opposite phases. Therefore, the amplitude of the differential signal between the first signal and the second signal can be maximized. Therefore, even when the constant interval a of the rotation position information in the rotating body is narrowed, it is possible to secure a detectable gap with respect to the rotating body.

According to the second aspect of the present embodiments, the detection unit includes a first magnetic element, a second magnetic element, and a third magnetic element. When a constant interval is defined as a, the first magnetic element and the third magnetic element are arranged with an interval of a in the rotation direction of the rotating body. The first magnetic element outputs the first signal. The third magnetic element outputs a third signal having the same phase as the first signal.

The second magnetic element is arranged between the first magnetic element and the third magnetic element in the rotation direction of the rotating body. The second magnetic element outputs a second signal having a phase with respect to the first signal and the third signal, and having the same period as the rotation position information.

The signal processing unit obtains the differential signal, as rotation position information having the same period as a constant interval, between a first calculation signal based on the second signal and having the same period as the second signal, and a second calculation signal based on the first signal and the third signal and having a phase with respect to the first calculation signal.

According to this, since the first magnetic element and the third magnetic element are arranged with an interval of a, the first signal and the third signal can be acquired as signals having a same phase of a. That is, the amplitude of the second calculation signal can be maximized. Therefore, the effect of the difference between the first calculation signal and the second calculation signal can be enhanced. That is, the amplitude of the differential signal can be secured. Therefore, even when the constant interval a of the rotation position information in the rotating body is narrowed, it is possible to secure a detectable gap with respect to the rotating body.

The following will describe embodiments for carrying out the present disclosure with reference to the drawings. In the respective embodiments, parts corresponding to matters already described in the preceding embodiments are given reference numbers identical to reference numbers of the matters already described. The same description is therefore omitted depending on circumstances. In a case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

First Embodiment

Hereinafter, a first embodiment will be described with reference to the drawings. The rotation detection device detects, for example, the rotation of a gear incorporated in a vehicle transmission. As shown in FIG. 1, the rotation detection device 100 is arranged so as to face the outer peripheral portion 201 of the gear 200. The gear 200 is a gear-shaped rotating body.

The outer peripheral portion 201 of the gear 200 is provided with convex portions 202 and concave portions 203 alternately arranged in the rotational direction. The convex portion 202 is a tooth. The convex portion 202 and the concave portion 203 indicate the rotation position information of the gear 200 in the rotation direction. The convex portion 202 and the concave portion 203 have a constant width in the rotation direction. The convex portion 202 and the concave portion 203 are periodically provided at regular intervals in the rotation direction. Note that FIG. 1 shows a part of the outer peripheral portion 201 of the gear 200 developed in a straight line.

Here, a constant interval is defined as a. The constant interval a is the gear pitch of the gear 200. The gear pitch is the distance between the convex portion 202 and the convex portion 202. Specifically, the gear pitch is a distance from the rise of the convex portion 202 in the rotation direction of the gear 200 to the rise of the adjacent convex portion 202. Alternatively, the gear pitch is defined from a predetermined position of the convex portion 202 in the rotation direction of the gear 200 to a position corresponding to the predetermined position in the adjacent convex portion 202. The predetermined position is, for example, the center position of the convex portion 202 in the rotation direction of the gear 200. Alternatively, the gear pitch is defined from the fall of the convex portion 202 in the rotation direction of the gear 200 to the fall of the adjacent convex portion 202.

That is, the constant interval a is a cycle of repeating the rotation position in the rotation direction of the gear 200. That is, the rotation position information is periodically provided on the outer peripheral portion 201 of the gear 200 at regular intervals a.

The rotation detection device 100 includes a case (not shown) formed by resin molding a resin material such as PPS. The case has a tip portion on the gear 200 side, a fixing portion fixed to a peripheral mechanism, and a connector portion to which a harness is connected. A sensing part is disposed within the tip portion.

Further, the case is fixed to the peripheral mechanism via the flange portion so that the tip portion has a predetermined gap with respect to the convex portion 202 of the gear 200. Therefore, the gear 200 moves with respect to the rotation detection device 100. The rotation detection device 100 includes a bias magnet 101 and a sensor chip 102 as sensing portions.

The bias magnet 101 increases a detection sensitivity of a magnetic field of the sensor chip 102 by a constant value by applying a bias magnetic field to the sensor chip 102. The bias magnet 101 has a cylindrical shape. The bias magnet 101 includes a hollow part where the sensor chip 102 is located.

The sensor chip 102 is constituted by a semiconductor chip. The sensor chip 102 includes a detection unit 103. The detection unit 103 employs a magnetic detection method using a magnetoresistive element. The detection unit 103 detects the magnetic change received from the outer peripheral portion 201 as the rotation position of the gear 200 changes due to the rotation of the gear 200. Specifically, the detection unit 103 outputs a signal corresponding to the position of the unevenness as the gear 200 rotates. The detection unit 103 is arranged with a predetermined gap with respect to the outer peripheral portion 201 of the gear 200 in the gap direction. That is, the gap direction is the radial direction of the gear 200.

Figure 2:
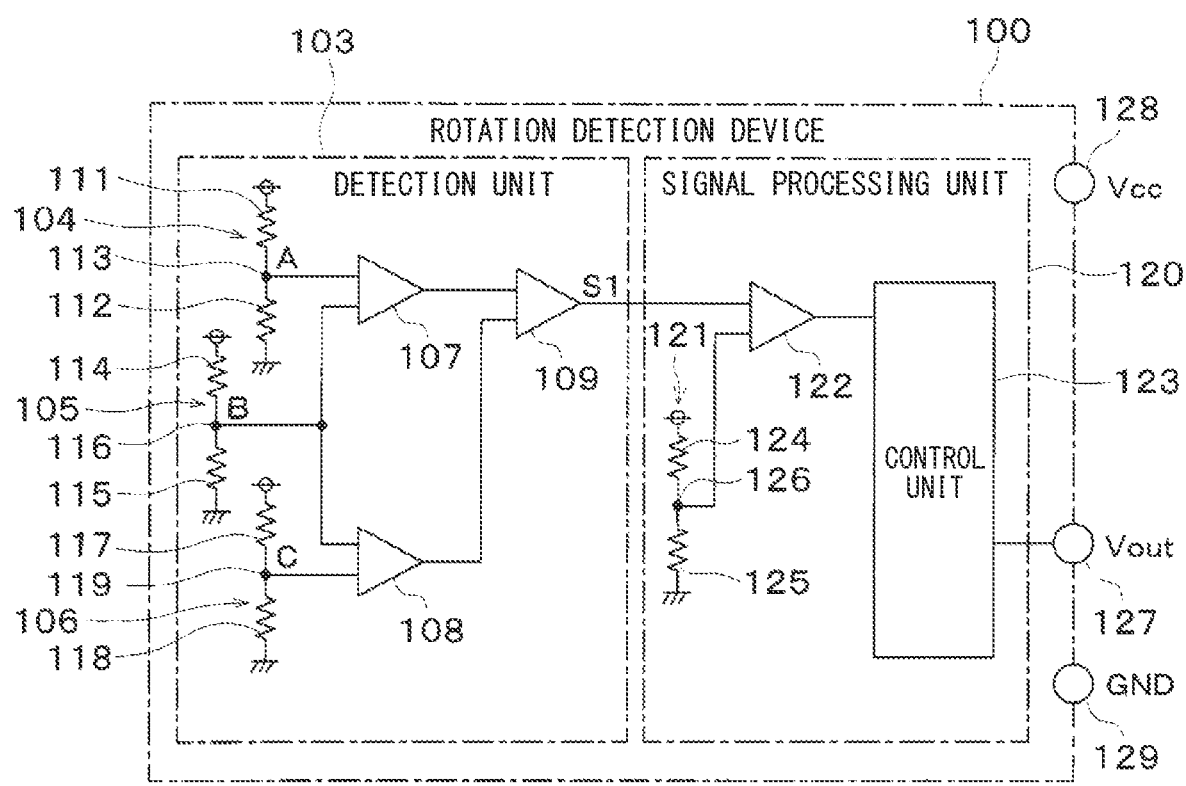
FIG. 2 is a diagram showing a circuit configuration of a rotation detection device according to a first embodiment.

As shown in FIGS. 1 and 2, the detection unit 103 includes a first magnetic detection element 104, a second magnetic detection element 105, a third magnetic detection element 106, a first operational amplifier 107, a second operational amplifier 108, and a third operational amplifier 109.

Each of the magnetic detection elements 104 to 106 is configured as a pair of magnetoresistive elements whose resistance value changes with the rotation of the gear 200. The magnetoresistive element pair has two resistance portions.

The magnetoresistive element pair is arranged on one side 110 of the sensor chip 102. Here, the above feature may include an arrangement that the pair is arranged on the one side 110 of the sensor chip 102, an arrangement that the pair is directly arranged on the one side 110 of the sensor chip 102, or an arrangement that the pair is arranged on a protection film disposed on the one side 110 of the sensor chip 102.

The magnetoresistive element pair constitutes a half bridge circuit. Specifically, as shown in FIG. 2, the first magnetic detection element 104 includes two resistance portions connected in series between a power supply (i.e., Vcc) and a ground (i,e., GND). The two resistance portions are magnetoresistive elements 111 and 112. The two resistance portions are formed in a predetermined wiring pattern. The two wiring patterns are formed, for example, in a quadrangular region.

The shape of the quadrangle is a square in this embodiment. Of course, each of the magnetic detection elements 104 to 106 may be formed in a rectangular region according to a requirement of the design. Further, the shapes of the region where the magnetic detection elements 104 to 106 are formed may be the same, or only one may be different.

The first magnetic detection element 104 detects a change in resistance value when each magnetoresistive element 111, 112 is affected by a magnetic field as the gear 200 rotates. Further, the first magnetic detection element 104 outputs the voltage at the midpoint 113 of each of the magnetoresistive elements 111 and 112 as the first detection signal A based on the change in the resistance value.

The second and third magnetic detection elements 105 and 106 have the same configuration as the first magnetic detection element 104. The second magnetic detection element 105 includes two magnetoresistive elements 114 and 115. The second magnetic detection element 105 outputs the voltage at the midpoint 116 of each magnetoresistive element 114 and 115 as the second detection signal B. The third magnetic detection element 106 includes two magnetoresistive elements 117 and 118. The third magnetic detection element 106 outputs the voltage at the midpoint 119 of each magnetoresistive element 117 and 118 as the third detection signal C.

The first to third operational amplifiers 107 to 109 are differential amplifiers. The midpoint potential of the midpoint 113 of the first magnetic detection element 104 is defined as A, and the midpoint potential of the midpoint 116 of the second magnetic detection element 105 is defined as B. The first operational amplifier 107 outputs the potential difference of A-B as a calculation result. The midpoint potential of the midpoint 119 of the third magnetic detection element 106 is defined as C. The second operational amplifier 108 outputs the potential difference of B−C as a calculation result.

The third operational amplifier 109 inputs the value of A−B from the first operational amplifier 107, and inputs the value of B−C from the second operational amplifier 108. Then, the third operational amplifier 109 calculates a value of {−(A−B)−(B−C)} and outputs the calculation result as the main signal S1 (=2B−A−C) to the signal processing unit 120.

The signal processing unit 120 is a circuit unit that acquires rotation position information of the gear 200 based on the detection result of the detection unit 103. The signal processing unit 120 is formed on the sensor chip 102. The signal processing unit 120 may be formed on another semiconductor chip (not shown).

The signal processing unit 120 includes a threshold value generation unit 121, a comparator 122, and a control unit 123. The threshold generation unit 121 is constituted by two resistors 124 and 125 which are connected between the power source (i.e., Vcc) and the ground (i.e., GND) in a series connection. The potential at the midpoint 126 of each of the resistors 124 and 125 is set as the binarization threshold. The binarization threshold is a threshold for binarizing the main signal S1.

The comparator 122 inputs the main signal S1 from the third operational amplifier 109 of the detection unit 103. The comparator 122 inputs the binarization threshold from the threshold generation unit 121. The comparator 122 compares the main signal S1 with the binarization threshold and generates a position signal obtained by binarizing the main signal S1.

The control unit 123 is a control circuit that inputs a position signal from the comparator 122 as rotation position information and performs predetermined signal processing. The control unit 123 outputs a position signal to an external device (not shown) via the output terminal 127 (i.e., Vout).

The above description relates to an entire configuration of the rotation detection device 100 according to the present embodiment. The rotation detection device 100 includes a power source terminal 128 (i.e., Vcc) and a ground terminal 129 (i.e., GND) which are connected with external devices. The rotation detection device 100 is supplied with electric power from an external device via the power supply terminal 128 and the ground terminal 129.

Next, the arrangement of the magnetic detection elements 104 to 106 on the sensor chip 102 will be described. First, as shown in FIG. 1, the magnetic detection elements 104 to 106 are disposed at the same position in the gap direction.

All magnetic detection elements 104 to 106 are located in the hollow portion of the bias magnet 101. In a situation where the rotation detection device 100 is not affected by the gear 200, a bias magnetic field along the central axis of the bias magnet 101 is applied to the second magnetic detection element 105. On the other hand, a bias magnetic field that involves the end of the bias magnet 101 is applied to the first magnetic detection element 104 and the third magnetic detection element 106.

Further, the first magnetic detection element 104 and the third magnetic detection element 106 are arranged at intervals of a in the rotation direction of the gear 200. That is, the distance between the first magnetic detection element 104 and the third magnetic detection element 106 is the same as the gear pitch.

The second magnetic detection element 105 is arranged between the first magnetic detection element 104 and the third magnetic detection element 106 in the rotation direction of the gear 200. In the present embodiment, the second magnetic detection element 105 is arranged at an intermediate position between the first magnetic detection element 104 and the third magnetic detection element 106. Therefore, the distance between the first magnetic detection element 104 and the second magnetic detection element 105 and the distance between the second magnetic detection element 105 and the third magnetic detection element 106 are the same.

The distance between the magnetic detection elements 104 to 106 is defined based on the center position in the rotation direction of the gear 200 as a reference position. The center position of the first magnetic detection element 104 and the center position of the third magnetic detection element 106 have an interval of a therebetween. The center position of the first magnetic detection element 104 and the center position of the second magnetic detection element 105 have an interval of a/2 therebetween. The center position of the second magnetic detection element 105 and the center position of the third magnetic detection element 106 have an interval of a/2 therebetween. Therefore, even if the layout of the magnetic detection elements 104 to 106 is different, the distance between the magnetic detection elements 104 to 106 is clearly determined.

Actually, the distance between the magnetic detection elements 104 to 106 is defined based on the center position in one direction of one side 110 of the sensor chip 102. The one direction is the direction of the tangent to the arc along the direction of rotation.

Subsequently, the signals of the magnetic detection elements 104 to 106 will be described. First, the first magnetic detection element 104 outputs the first detection signal A having the same period as the rotation position information. Further, the third magnetic detection element 106 is arranged with the distance of a with respect to the first magnetic detection element 104 in the rotation direction of the gear 200. Therefore, the third magnetic detection element 106 outputs the third detection signal C having the same phase as the first detection signal A. The amplitudes of the first detection signal A and the third detection signal C reach the maximum value at the falling edge of the convex portion 202. Further, the amplitudes of the first detection signal A and the third detection signal C becomes the minimum value at the rising edge of the convex portion 202.

The second magnetic detection element 105 is arranged at an intermediate position between the first magnetic detection element 104 and the third magnetic detection element 106 in the rotation direction of the gear 200. Therefore, the second magnetic detection element 105 outputs the second detection signal B having the opposite phase to the first detection signal A and the third detection signal C. The amplitude of the second detection signal B reaches its maximum value at the rising edge of the convex portion 202. Further, the amplitude of the second detection signal B becomes the minimum value at the falling edge of the convex portion 202.

As described above, the detection unit 103 acquires the main signal S1 from the first detection signal A, the second detection signal B, and the third detection signal C. The main signal S1 is defined as an equation of $S1=2B-A-C=2B-(A+C)$. That is, the main signal S1 is a differential signal between the first calculated signal and the second calculated signal.

The first calculation signal is based on the second detection signal B and has the same period as the second detection signal B. The amplitude of the first calculation signal is twice larger than the amplitude of the second detection signal B. That is, the amplitude of the first calculation signal is defined as 2B.

The second calculated signal is a signal based on the first detection signal A and the third detection signal C and having a phase with respect to the first calculation signal. The amplitude of the second calculation signal is obtained by adding the amplitude of the first detection signal A and the amplitude of the third detection signal C. That is, the amplitude of the second calculation signal is defined as A+C.

The second detection signal B, the first detection signal A, and the third detection signal C are signals having the same period and opposite phases. Therefore, the amplitude of the main signal S1 is the difference between the maximum amplitude of the second calculation signal and the maximum amplitude obtained by adding the amplitude of the first detection signal A and the amplitude of the third detection signal C. Therefore, the amplitude of the main signal S1 can be maximized.

As shown in FIG. 1, the main signal S1 which is a differential signal is a signal having the same period as the constant interval a of the gear 200. Further, the main signal S1 is a signal having a waveform corresponding to the uneven structure of the convex portion 202 and the concave portion 203 of the gear 200. The amplitude of the main signal S1 is maximized at the concave portion 203, the convex portion 202, and the edge portion of the gear 200. That is, the main signal S1 is a signal indicating the rotation position information of the gear 200.

The signal processing unit 120 compares the main signal S1 with the binarization threshold value and binarizes the main signal S1. In addition, the control unit 123 processes the binarized position signal and outputs it to an external device.

Figure 3:
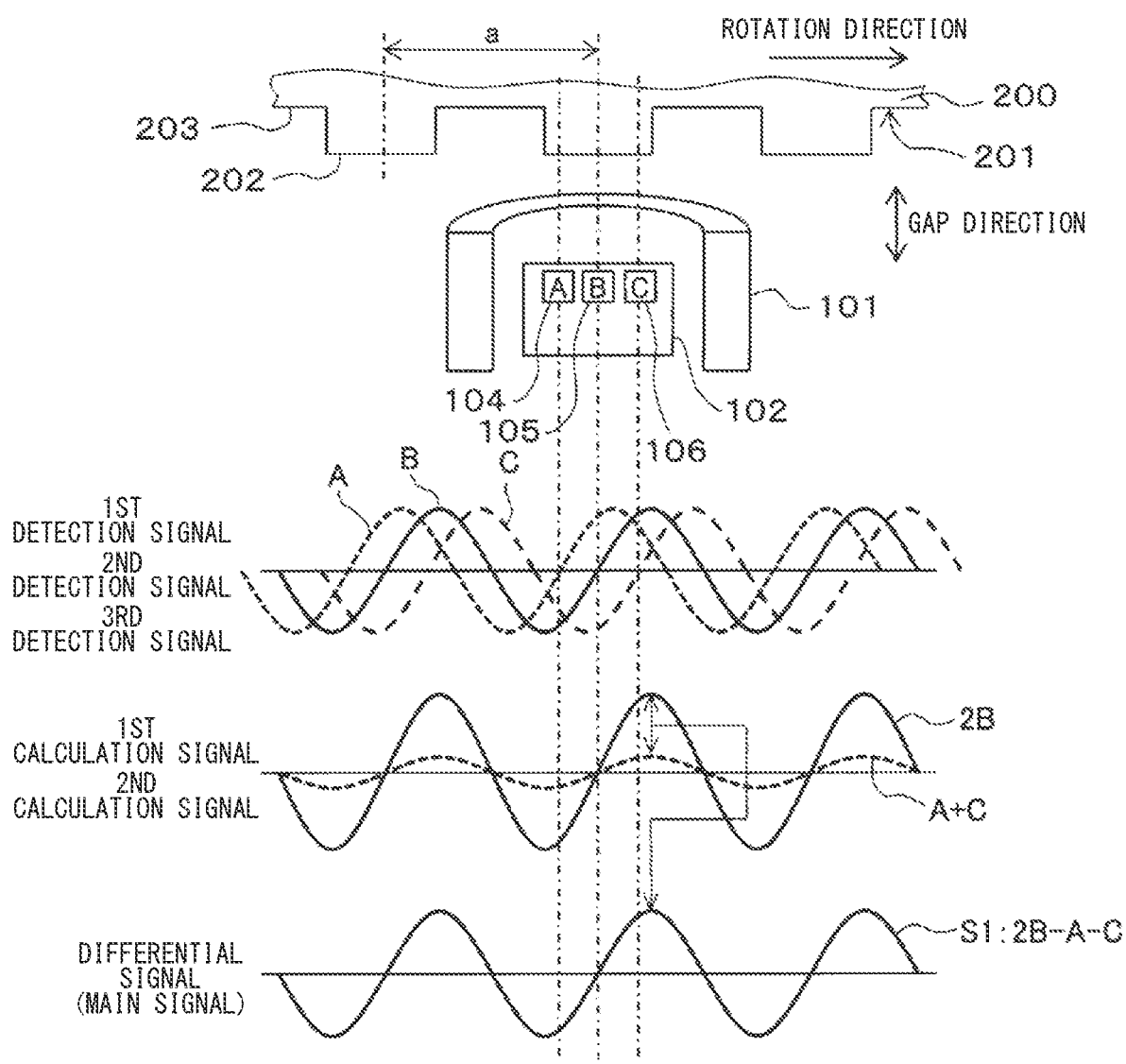
FIG. 3 shows, as a comparative example, the arrangement relationship between the rotation detection device and the gear and each signal when the distance between the first magnetic detection element and the third magnetic detection element is smaller than a/2.

As a comparative example, as shown in FIG. 3, the distance between the first magnetic detection element 104 and the third magnetic detection element 106 may be smaller than a/2. In this case, the periods of the first detection signal A of the first magnetic detection element 104 and the third detection signal C of the third magnetic detection element 106 are close to the opposite phase. Therefore, the amplitude of the second calculation signal is defined as A+C, but the two amplitudes cancel each other. The amplitude of the second calculation signal is smaller than the amplitude of the first calculation signal.

As a result, when the differential between the first calculation signal and the second calculation signal is calculated, the amplitude of the first calculation signal is reduced by the amplitude of the second calculation signal. Therefore, the amplitude of the main signal S1 is smaller than a case where the first magnetic detection element 104 and the third magnetic detection element 106 are arranged at intervals of a.

In contrast to the comparative example, in the present embodiment, the first magnetic detection element 104 and the third magnetic detection element 106 are arranged with an interval of a. As a result, the first detection signal A and the third detection signal C can be acquired as signals having a period of a. That is, the amplitude of the second calculation signal can be maximized. Further, the second magnetic detection element 105 is arranged at a middle point between the first magnetic detection element 104 and the third magnetic detection element 106. As a result, the first calculation signal and the second calculation signal can be in an opposite phase relationship. That is, the effect of the differential between the first calculation signal and the second calculation signal can be maximized. Therefore, even if the constant interval a of the rotation position information in the gear 200 is narrowed, the amplitude of the main signal S1 can be maximized, so that a detectable gap with respect to the gear 200 can be secured.

The distance between the first magnetic detection element 104 and the third magnetic detection element 106 may be preferably exactly the same as a, alternatively, the distance may not be exactly the same, and a slight deviation may be acceptable as long as the same effect is obtained. Similarly, the second magnetic detection element 105 may be preferably arranged at a position intermediate between the first magnetic detection element 104 and the third magnetic detection element 106, alternatively, when the similar effect is obtained, the second magnetic detection element 105 may be arranged merely between the first magnetic detection element 104 and the third magnetic detection element 106.

As a modification, the second magnetic detection element 105 may not be located between the first magnetic detection element 104 and the third magnetic detection element 106. Here, from the viewpoint of ensuring the amplitude, the position of the second magnetic detection element 105 may be preferably in the range where the similar effect can be obtained.

The gear 200 of this embodiment corresponds to a rotating body. The first magnetic detection element 104, the second magnetic detection element 105, and the third magnetic detection element 106 of the present embodiment correspond to the first magnetic element, the second magnetic element, and the third magnetic element.

Further, the first detection signal A, the second detection signal B, and the third detection signal C of the present embodiment correspond to the first signal, the second signal, and the third signal. The main signal S1 of this embodiment corresponds to a differential signal.

Second Embodiment

Figure 4:
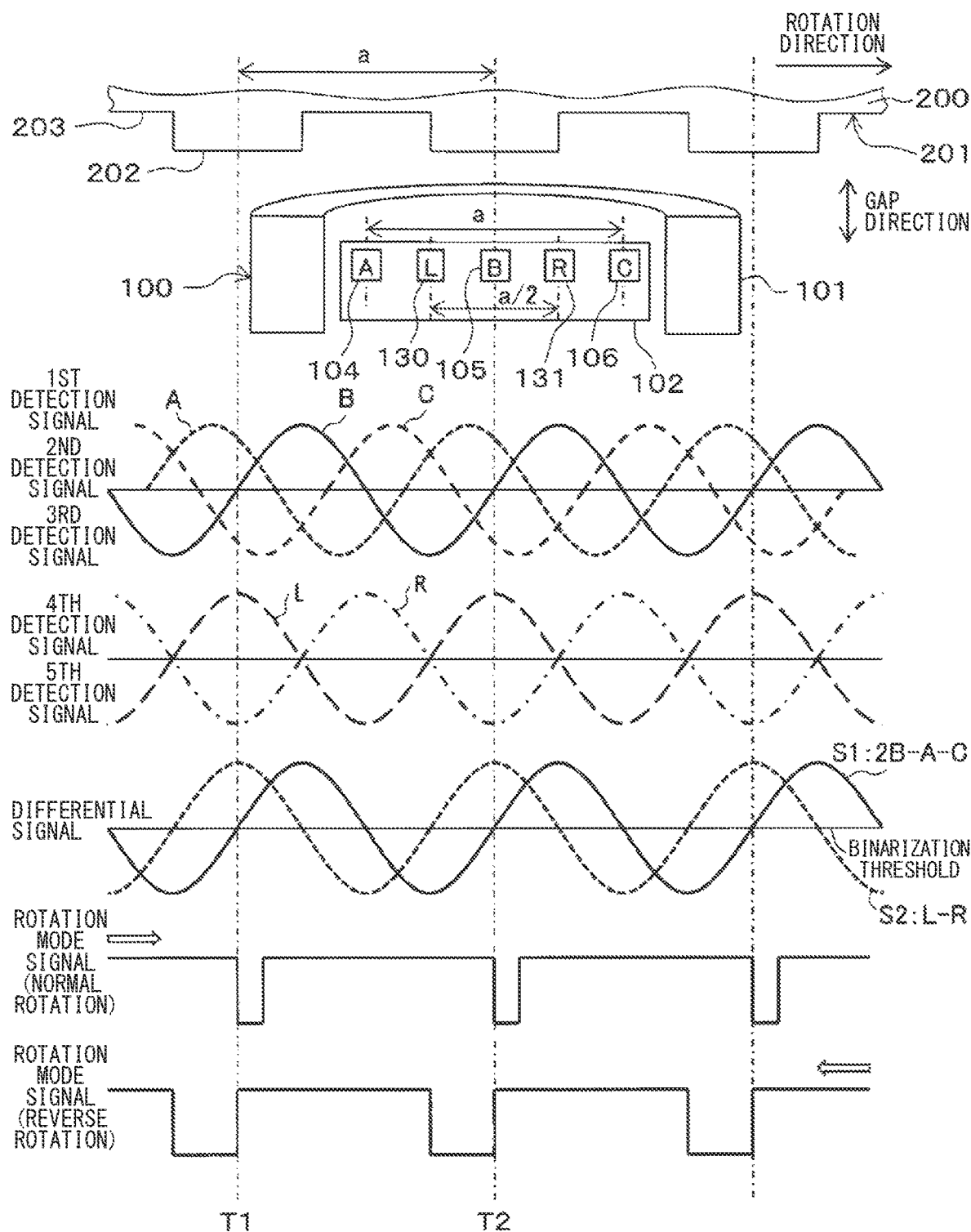
FIG. 4 is a diagram showing an arrangement relationship between a rotation detection device and a gear and each signal according to the second embodiment.

In the present embodiment, portions different from those of the first embodiment will be mainly described. As shown in FIG. 4, the detection unit 103 further includes a fourth magnetic detection element 130 and a fifth magnetic detection element 131. The configuration of the fourth magnetic detection element 130 and the fifth magnetic detection element 131 is configured as a magnetoresistive element pair, similarly to the magnetic detection elements 104 to 106.

The fourth magnetic detection element 130 and the fifth magnetic detection element 131 are arranged between the first magnetic detection element 104 and the third magnetic detection element 106 in the rotation direction of the gear 200. The fourth magnetic detection element 130 and the fifth magnetic detection element 131 are formed in a square region on one surface 110 of the sensor chip 102. The fourth magnetic detection element 130 and the fifth magnetic detection element 131 may be formed in a rectangular region according to the design. Further, the shape of the region where the fourth magnetic detection element 130 and the fifth magnetic detection element 131 are formed may be the same as or different from the others.

Further, the fourth magnetic detection element 130 and the fifth magnetic detection element 131 are arranged at intervals of a/2 in the rotation direction of the gear 200. Specifically, in the fourth magnetic detection element 130 and the fifth magnetic detection element 131, the center position of the fourth magnetic detection element 130 and the center position of the fifth magnetic detection element 131 in the rotation direction of the gear 200 are arranged with a distance of a/2.

The fourth magnetic detection element 130 and the fifth magnetic detection element 131 are arranged at the same positions as the first magnetic detection element 104, the second magnetic detection element 105, and the third magnetic detection element 106 in the gap direction.

The second magnetic detection element 105 is arranged between the fourth magnetic detection element 130 and the fifth magnetic detection element 131 in the rotation direction of the gear 200. Therefore, the fourth magnetic detection element 130 is arranged between the first magnetic detection element 104 and the second magnetic detection element 105. The fifth magnetic detection element 131 is arranged between the second magnetic detection element 105 and the third magnetic detection element 106.

Figure 5:
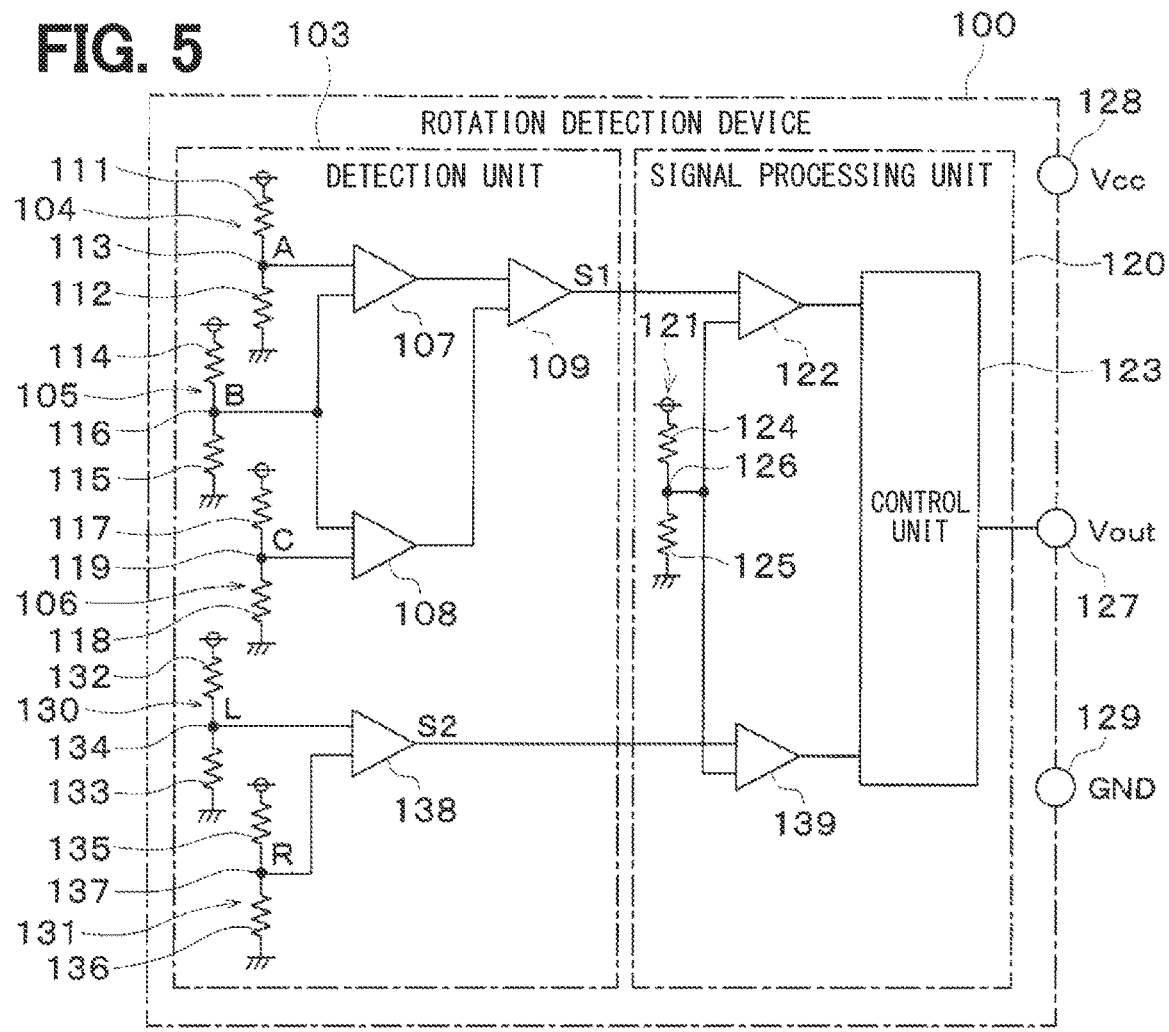
FIG. 5 is a diagram showing a circuit configuration of a rotation detection device according to a second embodiment.

As shown in FIG. 5, the fourth magnetic detection element 130 includes two magnetoresistive elements 132 and 133. The voltage at the midpoint 134 of each magnetoresistive element 132 and 133 is output as the fourth detection signal L. The fifth magnetic detection element 131 includes two magnetoresistive elements 135 and 136. The fifth magnetic detection element 131 outputs the voltage at the midpoint 137 of each magnetoresistive element 135 and 136 as the fifth detection signal R.

The detection unit 103 further includes a fourth operational amplifier 138. The fourth operational amplifier 138 is a differential amplifier. The midpoint potential of the midpoint 134 of the fourth magnetic detection element 130 is defined as L, and the midpoint potential of the midpoint 137 of the fifth magnetic detection element 131 is defined as R. The fourth operational amplifier 138 calculates a value of (L−R) and outputs the result as a signal S2. A signal of S2 is a sub signal of a waveform having a phase difference relative to the main signal S1. For example, the sub signal S2 becomes maximum in amplitude at a center of the convex portion 202 of the gear 200 in a rotation direction and becomes minimum in amplitude at a center of the concave portion 203 in a rotation direction.

The comparator 122 described in the first embodiment is referred to as a first comparator 122. The signal processing unit 120 further includes a second comparator 139. The second comparator 139 receives the sub signal S2 from the fourth operational amplifier 138 of the detection unit 103 and also receives the binarization threshold from the threshold generation unit 121. The second comparator 139 compares the sub signal S2 with the binarization threshold and generates a phase signal obtained by binarizing the sub signal S2.

The control unit 123 inputs a position signal as rotation position information from the first comparator 122. Further, the control unit 123 inputs a phase signal from the second comparator 139 as rotation mode information of the gear 200. The rotation mode information is information indicating whether the rotation direction of the gear 200 is forward rotation or reverse rotation.

The control unit 123 determines whether the rotation direction of the gear 200 is forward rotation or reverse rotation based on the rotation position information and the rotation mode information. The control unit 123 outputs information of the position signal and the rotation direction of the gear 200 to an external device that is not shown through an output terminal 127 (i.e., Vout).

Next, the signals of the fourth magnetic detection element 130 and the fifth magnetic detection element 131 will be described. First, as shown in FIG. 4, the fourth magnetic detection element 130 outputs a fourth detection signal L having the same period as a constant interval. The amplitude of the fourth detection signal L becomes the maximum value at the center of the width of the convex portion 202 in the rotation direction of the gear 200. Further, the amplitude of the fourth detection signal L becomes the minimum value at the center of the width of the concave portion 203 in the rotation direction of the gear 200.

Further, the fifth magnetic detection element 131 is arranged with the distance of a/2 with respect to the fourth magnetic detection element 130 in the rotation direction of the gear 200. Therefore, the fifth magnetic detection element 131 outputs the fifth detection signal R, which has the opposite phase to the fourth detection signal L and has the same period as the constant interval. That is, the fifth detection signal R has the maximum amplitude at the center of the width of the concave portion 203 in the rotation direction of the gear 200. Further, the amplitude of the fifth detection signal R becomes the minimum value at the center of the width of the convex portion 202 in the rotation direction of the gear 200.

As described above, the detection unit 103 acquires the sub signal S2 from the fourth detection signal L and the fifth detection signal R. The sub signal S2 has a value of S2=L−R. That is, the sub signal S2 is a differential signal between the fourth detection signal L and the fifth detection signal R. This differential signal is a signal having a phase with respect to the main signal S1.

Therefore, the control unit 123 acquires the sub signal S2 having a phase with respect to the main signal S1 as the rotation mode information of the gear 200 based on the detection results of the fourth magnetic detection element 130 and the fifth magnetic detection element 131.

Subsequently, determination of the rotation direction of the gear 200 will be described. As described above, the signal processing unit 120 acquires the position signal obtained by binarizing the main signal S1. The position signal indicates, for example, Hi when the signal amplitude of the main signal S1 is larger than the binarization threshold, and indicates, for example, Lo when the signal amplitude of the main signal S1 is smaller than the binarization threshold.

Further, the signal processing unit 120 acquires a phase signal obtained by binarizing the sub signal S2. The phase signal indicates, for example, Hi when the amplitude of the sub signal S2 is larger than the binarization threshold, and indicates, for example, Lo when the amplitude of the sub signal S2 is smaller than the binarization threshold.

At any time, the main signal S1, the sub signal S2, the position signal, and the phase signal are generated as the gear 200 rotates, and the position signal and the phase signal are input to the control unit 123. Then, the control unit 123 determines whether the rotation direction of the gear 200 is forward rotation or reverse rotation based on the position signal and the phase signal. That is, the signal processing unit 120 determines the rotation direction of the gear 200 based on the rotation position information and the rotation mode information.

Specifically, when the rotation direction of the gear 200 is forward rotation, the amplitude of the main signal S1 becomes larger than the binarization threshold before and after the time point T1. Thus, the position signal changes from Lo to Hi. Since the signal amplitude of the sub signal S2 is greater than the binarization threshold, the phase signal that is binarized becomes Hi. Thus, the control unit 123 determines that the gear 200 is in the forward rotation under a condition where the position signal rises from Lo to Hi and the phase signal is Hi. The signal processing unit 120 outputs a rotation mode signal that falls at the time point T1 to an external device as a signal indicating the forward rotation.

When the rotation direction of the gear 200 is in the reverse rotation, the amplitude of the main signal S1 becomes smaller than the binarization threshold around the time point T1. Thus, the position signal changes from Hi to Lo. Since the signal amplitude of the sub signal S2 is greater than the binarization threshold, the phase signal that is binarized becomes Hi. Thus, the control unit 123 determines that the gear 200 is in the reverse rotation under a condition where the position signal falls from Hi to Lo and the phase signal is Hi. The signal processing unit 120 outputs a rotation mode signal as a signal indicating reverse rotation to an external device, and the signal falls at the time point T1 and has a larger pulse width than in the case of forward rotation. The above determination is the same at other time points such as time point T2.

As described above, the detection unit 103 includes five elements 104 to 106, 130, and 131. Further, since the fourth magnetic detection element 130 and the fifth magnetic detection element 131 are arranged with an interval of a/2, the fourth detection signal L and the fifth detection signal R are acquired as signals of opposite phases. Therefore, the amplitude of the sub signal S2, which is a differential signal between the fourth detection signal L and the fifth detection signal R, can be maximized. Therefore, even if the constant interval a of the rotation position information in the gear 200 is narrowed, the amplitude of the sub signal S2 can be maximized, so that the determination in the rotation direction of the gear 200 can be improved.

Figure 6:
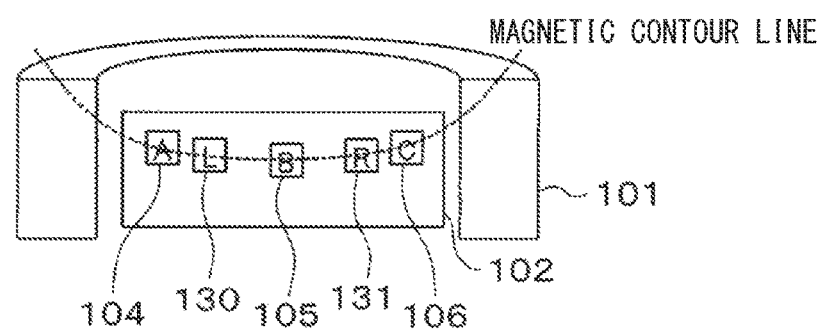
FIG. 6 is a diagram showing a modified example of the arrangement of each magnetic detection element according to the second embodiment.

As a modification, the five elements 104 to 106, 130, and 131 may be arranged at positions corresponding to the magnetic field generated by the bias magnet 101. For example, as shown in FIG. 6, when the whole of the sensor chip 102 is located in the hollow portion of the bias magnet 101, the five elements 104 to 106, 130, and 131 are arranged along one of the concave magnetic force contour lines. The first magnetic detection element 104 and the third magnetic detection element 106, the fourth magnetic detection element 130, the fifth magnetic detection element 131, and the second magnetic detection element 105 are located inside the hollow portion in this order. The arrangement shown in FIG. 6 has an advantage that it is resistant to external disturbance because the sensor chip 102 is located in the hollow portion of the bias magnet 101.

Figure 7:
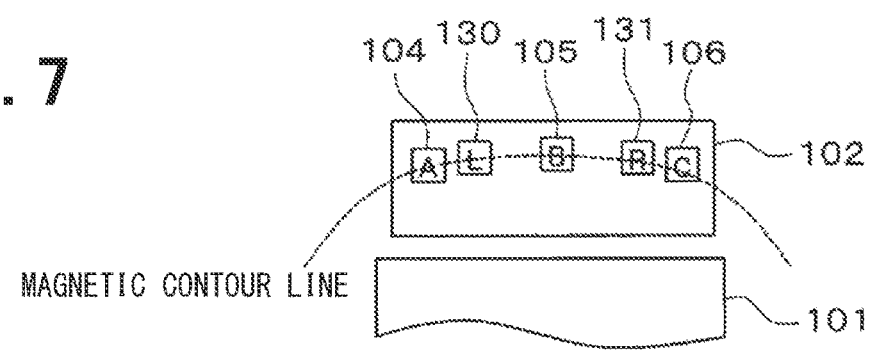
FIG. 7 is a diagram showing a modified example of the arrangement of each magnetic detection element according to the second embodiment.

Further, as shown in FIG. 7, when the whole of the sensor chip 102 is located outside the hollow portion of the bias magnet 101, the five elements 104 to 106, 130 and 131 are arranged along one of the convex magnetic force contour lines. The first magnetic detection element 104, the third magnetic detection element 106, the fourth magnetic detection element 130, the fifth magnetic detection element 131, and the second magnetic detection element 105 are located apart from the bias magnet 101 in this order. In the arrangement of FIG. 7, since the sensor chip 102 is closer to the gear 200 than the bias magnet 101, the fluctuation of the signal amplitude can be increased.

Figure 8:
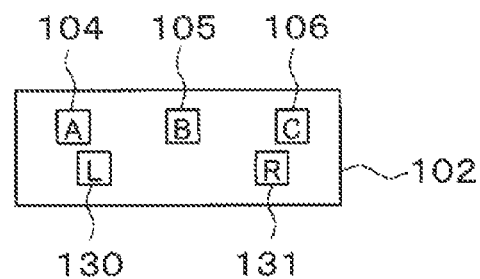
FIG. 8 is a diagram showing a modified example of the arrangement of each magnetic detection element according to the second embodiment.

As a modification, as shown in FIG. 8, five elements 104 to 106, 130, and 131 may be arranged in a W shape. That is, the first magnetic detection element 104, the second magnetic detection element 105, and the third magnetic detection element 106 are arranged closer to the gear 200 than the fourth magnetic detection element 130 and the fifth magnetic detection element 131.

Figure 9:
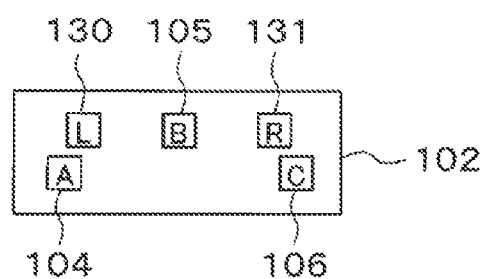
FIG. 9 is a diagram showing a modified example of the arrangement of each magnetic detection element according to the second embodiment.

Alternatively, as shown in FIG. 9, five elements 104 to 106, 130, and 131 may be arranged in an M shape. That is, the second magnetic detection element 105, the fourth magnetic detection element 130, and the fifth magnetic detection element 131 are arranged closer to the gear 200 than the first magnetic detection element 104 and the third magnetic detection element 106. The arrangements of FIGS. 8 and 9 are effective when the distance between the first magnetic detection element 104 and the third magnetic detection element 106 cannot be secured to be equal to a.

Figure 10:
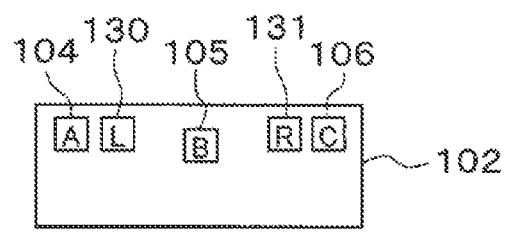
FIG. 10 is a diagram showing a modified example of the arrangement of each magnetic detection element according to the second embodiment.

As a modification, as shown in FIG. 10, the second magnetic detection element 105 may be arranged at a position away from the outer peripheral portion 201 of the gear 200 than the first magnetic detection element 104, the third magnetic detection element 106, the fourth magnetic detection element 130, and the fifth magnetic detection element 131. The first magnetic detection element 104, the third magnetic detection element 106, the fourth magnetic detection element 130, and the fifth magnetic detection element 131 are arranged at the same position in the gap direction.

Figure 11:
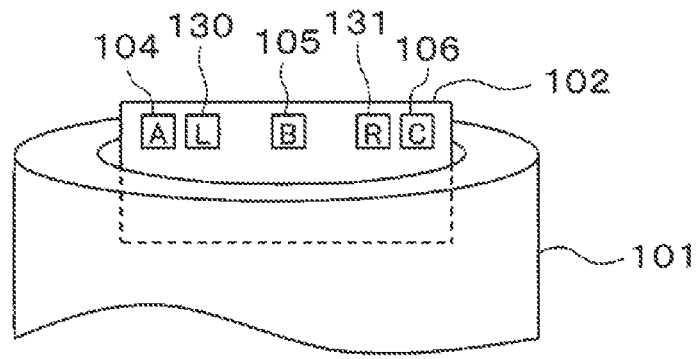
FIG. 11 is a diagram showing a modified example of the arrangement of the bias magnet and the sensor chip according to the second embodiment.

As a modification, as shown in FIG. 11, a part of the sensor chip 102 may be located in the hollow portion of the bias magnet 101. In this case, the portion of the sensor chip 102 in which the five elements 104 to 106, 130, and 131 are arranged is located outside the hollow portion of the bias magnet 101. In the arrangement of FIG. 11, it is possible to increase the amplitude fluctuation of the signal and secure resistance to disturbance.

The fourth magnetic detection element 130 and the fifth magnetic detection element 131 of the present embodiment correspond to the fourth magnetic element and the fifth magnetic element. The fourth detection signal L and the fifth detection signal R of the present embodiment correspond to the fourth signal and the fifth signal. The sub signal S2 of the present embodiment corresponds to a signal having a phase with respect to the differential signal.

Third Embodiment

Figure 12:
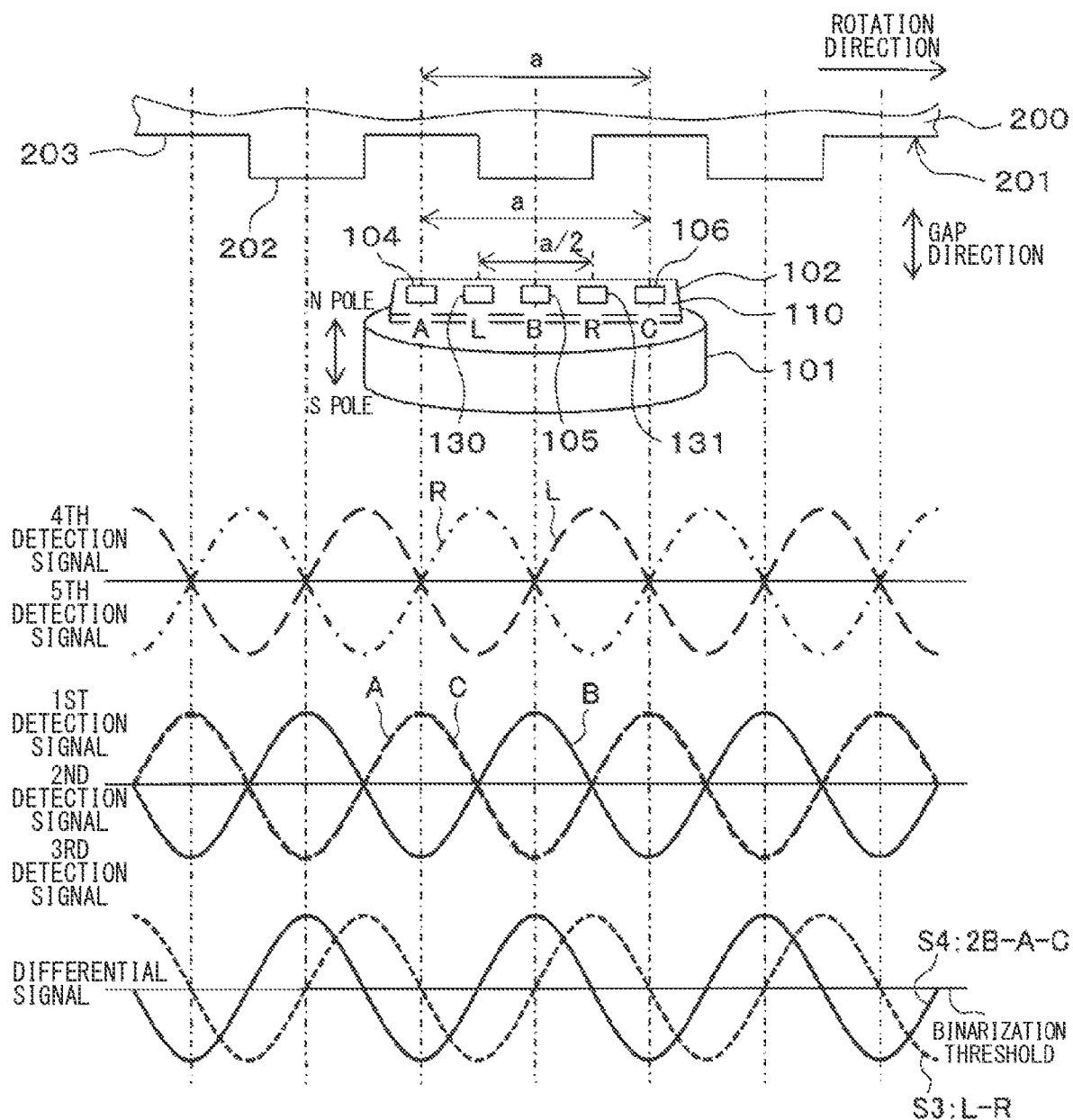
FIG. 12 is a diagram showing an arrangement relationship between a rotation detection device and a gear and each signal according to the third embodiment.

In the present embodiment, portions different from those of the first and second embodiments will be mainly described. As shown in FIG. 12, the detection unit 103 employs a magnetic detection method using a Hall element. Therefore, the five elements 104 to 106, 130, and 131 are configured as Hall elements.

The bias magnet 101 has a columnar shape. In this embodiment, the north pole of the bias magnet 101 is located in the gear 200. The sensor chip 102 is arranged above the end face of the bias magnet 101 so that one side 110 faces the gear 200 side. When the gear 200 rotates, the detection signal becomes maximum corresponding to the positions of the elements 104 to 106, 130, and 131.

In the present embodiment, the signal processing unit 120 acquires the differential signal between the fourth detection signal L and the fifth detection signal R as the main signal S3 (i.e., S3=L−R). The amplitude of the fourth detection signal L reaches its maximum value at the rising edge of the convex portion 202 of the gear 200. Further, the amplitude of the fourth detection signal L becomes the minimum value at the falling edge of the convex portion 202. The fifth detection signal R has an amplitude with a phase opposite to that of the fourth detection signal L. Further, the signal processing unit 120 acquires the sub signal S4 (i.e., S4=2B−A−C) from the first detection signal A, the second detection signal B, and the third detection signal C.

The process of the control unit 123 for acquiring the position signal and the phase signal and the process of determining the rotation direction of the gear 200 are the same as those of the second embodiment. Moreover, the same effect as that of the first and second embodiments can be obtained. As described above, even when the Hall element is adopted, the rotation position and the rotation direction of the gear 200 can be acquired.

The main signal S3 of this embodiment corresponds to a differential signal. The sub signal S4 of the present embodiment corresponds to a signal having a phase with respect to the differential signal.

Fourth Embodiment

Figure 13:
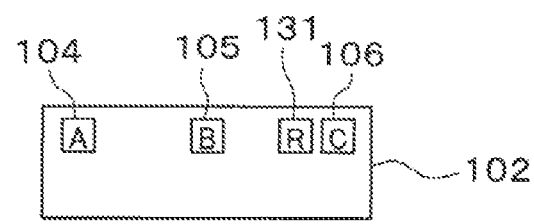
FIG. 13 is a diagram showing an example of the arrangement of each magnetic detection element according to the fourth embodiment.

In the present embodiment, portions different from those of the first and second embodiments will be mainly described. As shown in FIG. 13, the detection unit 103 includes a first magnetic detection element 104, a second magnetic detection element 105, a third magnetic detection element 106, and a fifth magnetic detection element 131. The fifth magnetic detection element 131 is arranged between the second magnetic detection element 105 and the third magnetic detection element 106 in the rotation direction of the gear 200. That is, the detection unit 103 has four elements.

The signal processing unit 120 acquires the main signal S5 (i.e., S5=2B−A−C) as in the first embodiment. Therefore, the signal processing unit 120 acquires the sub signal S6 having a phase with respect to the main signal S5 as the rotation mode information of the gear 200 based on the detection results of the first magnetic detection element 104 and the fifth magnetic detection element 131. The sub signal S6 has a value of S6=A−R. That is, the sub signal S6 is a differential signal between the first detection signal A and the fifth detection signal R.

The process of the control unit 123 for acquiring the position signal and the phase signal and the process of determining the rotation direction of the gear 200 are the same as those of the second embodiment. Moreover, the same effect as that of the first and second embodiments can be obtained. As described above, the rotation position and the rotation direction of the gear 200 can be acquired even with the four elements.

Figure 14:
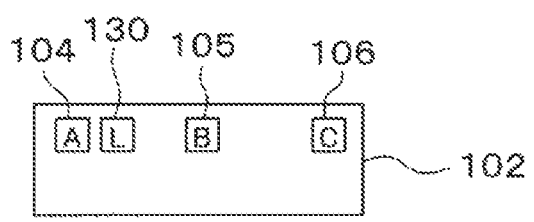
FIG. 14 is a diagram showing a modified example of the arrangement of each magnetic detection element according to the fourth embodiment.

As a modification, as shown in FIG. 14, the detection unit 103 may have the fourth magnetic detection element 130 instead of the fifth magnetic detection element 131. The fourth magnetic detection element 130 is arranged between the first magnetic detection element 104 and the second magnetic detection element 105 in the rotation direction of the gear 200.

In this case, the signal processing unit 120 acquires the main signal S7 (i.e., S7=2B−A−C) in the same manner as described above. Further, the signal processing unit 120 acquires the value of L−C as the sub signal S8 based on the detection results of the third magnetic detection element 106 and the fourth magnetic detection element 130. That is, the sub signal S8 is a differential signal between the fourth detection signal L and the third detection signal C. In this way, the fourth magnetic detection element 130 may be adopted.

The fifth magnetic detection element 131 of the present embodiment corresponds to the fourth magnetic element. The main signals S5 and S7 of this embodiment correspond to differential signals. The sub signals S6 and S8 of the present embodiment correspond to signals having a phase with respect to the differential signals, respectively.

Fifth Embodiment

Figure 15:
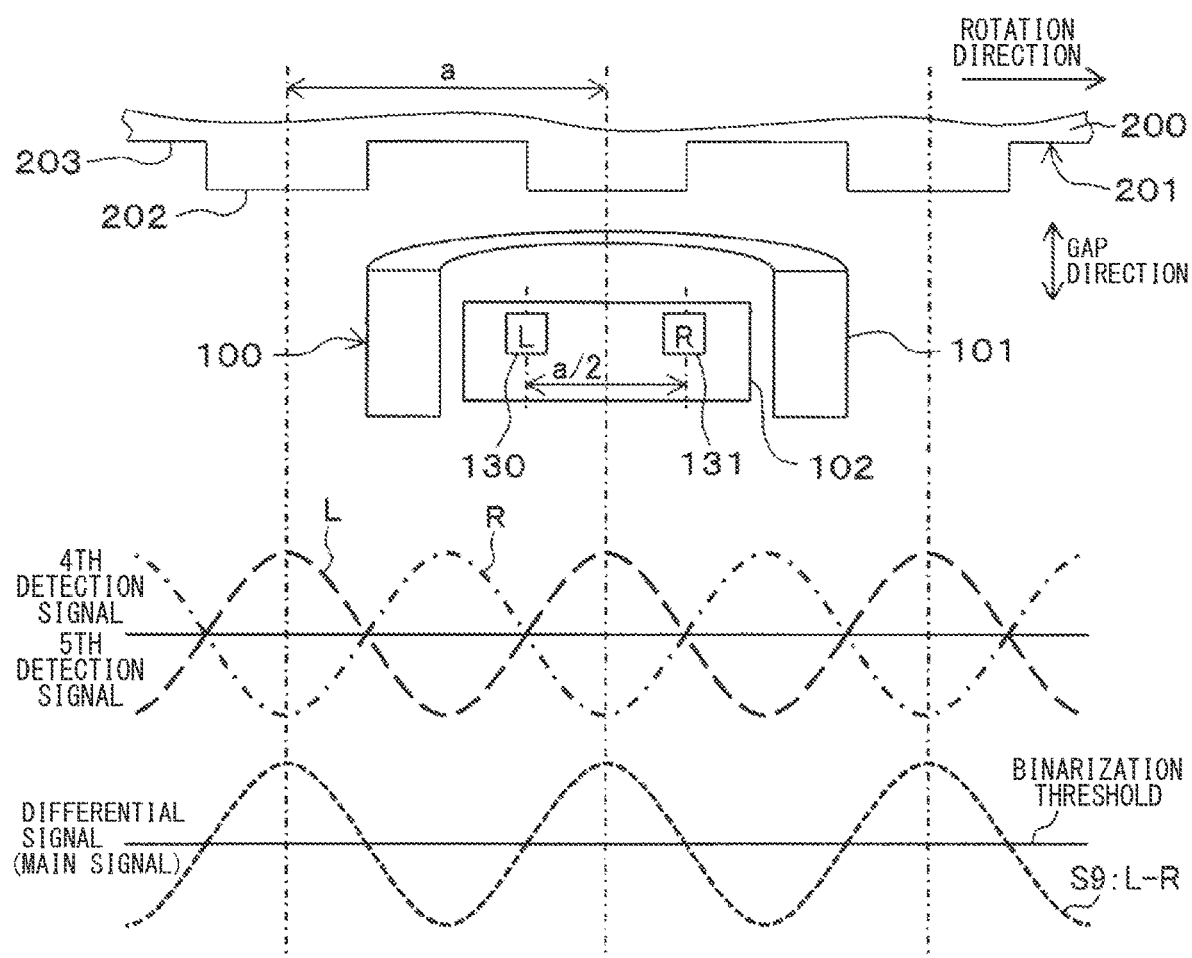
FIG. 15 is a diagram showing an arrangement relationship between a rotation detection device and a gear and each signal according to the fifth embodiment.
Figure 16:
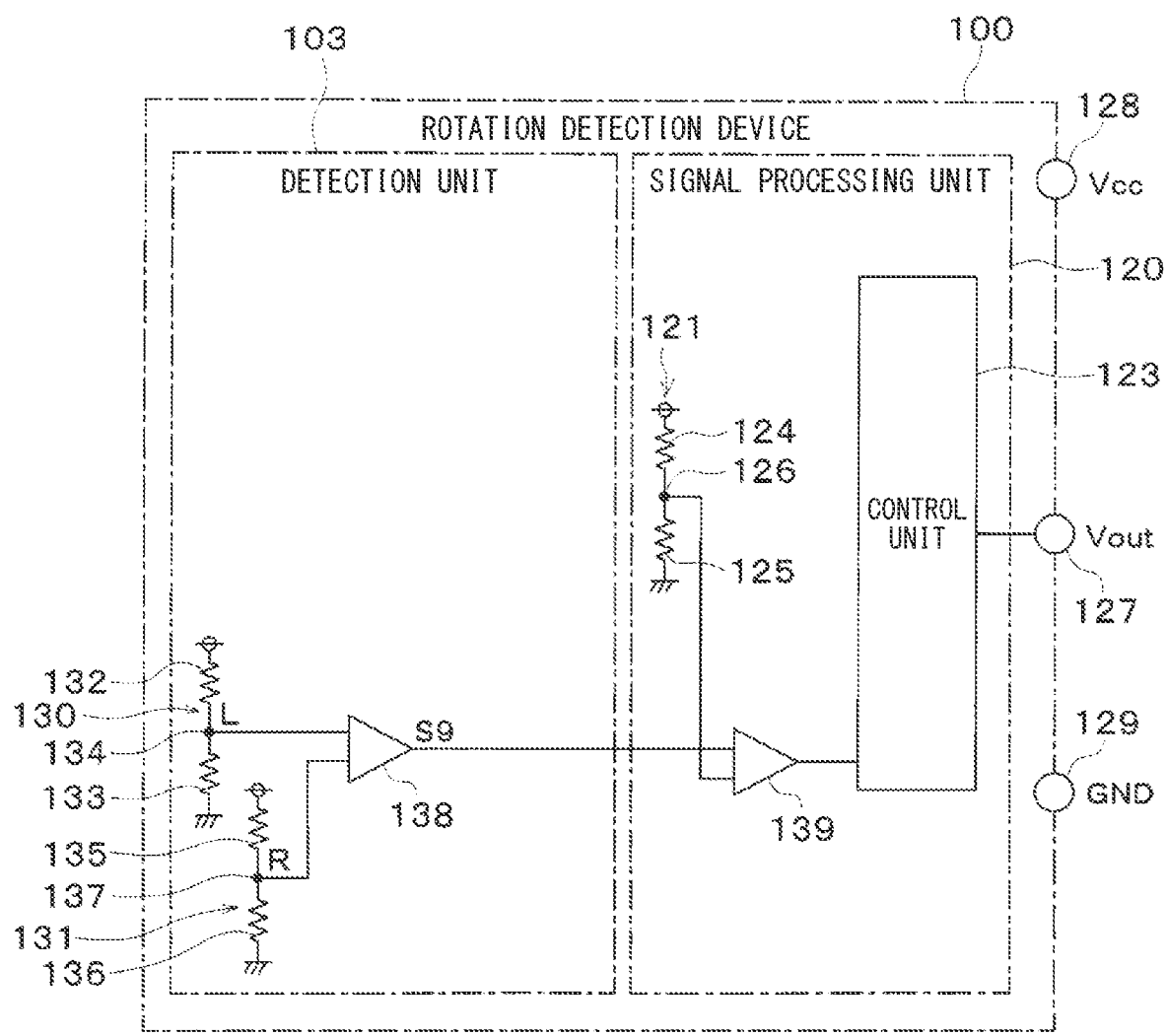
FIG. 16 is a diagram showing a circuit configuration of a rotation detection device according to a fifth embodiment.

In the present embodiment, portions different from those of the first to fourth embodiments will be mainly described. In the present embodiment, the rotation detection device 100 detects the rotation position of the gear 200 by two elements. Therefore, as shown in FIGS. 15 and 16, the detection unit 103 includes the fourth magnetic detection element 130 and the fifth magnetic detection element 131. The arrangement and signals of the fourth magnetic detection element 130 and the fifth magnetic detection element 131 are the same as those in the second embodiment.

The signal processing unit 120 acquires the main signal S9 (i.e., S9=L−R) based on the fourth detection signal L and the fifth detection signal R as rotation position information having the same period as a constant interval. The second comparator 139 receives the main signal S9 from the fourth operational amplifier 138 of the detection unit 103 and also receives the binarization threshold value from the threshold generation unit 121. The second comparator 139 compares the main signal S9 with the binarization threshold value and generates a position signal obtained by binarizing the main signal S9.

Further, since the fourth magnetic detection element 130 and the fifth magnetic detection element 131 are arranged with an interval of a/2, the fourth detection signal L and the fifth detection signal R are acquired as signals of opposite phases. Therefore, the amplitude of the main signal S9 between the fourth detection signal L and the fifth detection signal R can be maximized. Therefore, even when the constant interval a of the rotation position information in the gear 200 is narrowed, it is possible to secure a detectable gap with respect to the gear 200.

Further, in the detection unit 103, only two elements are required to be supplied power. Therefore, the power consumption of the rotation detection device 100 can be suppressed.

The fourth magnetic detection element 130 of the present embodiment corresponds to the first magnetic element. The fifth magnetic detection element 131 of the present embodiment corresponds to the second magnetic element. The fourth detection signal L and the fifth detection signal R of the present embodiment correspond to the first signal and the second signal. The main signal S9 of this embodiment corresponds to a differential signal.

Sixth Embodiment

Figure 17:
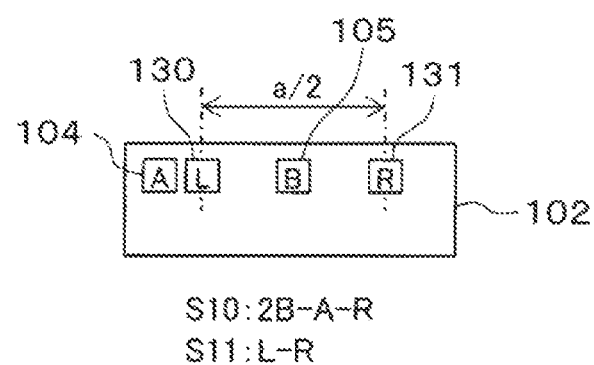
FIG. 17 is a diagram showing an example of the arrangement of each magnetic detection element according to the sixth embodiment.

In the present embodiment, portions different from those of the fifth embodiment will be mainly described. As shown in FIG. 17, the detection unit 103 includes a first magnetic detection element 104, a second magnetic detection element 105, a fourth magnetic detection element 130, and a fifth magnetic detection element 131. The fourth magnetic detection element 130 is arranged between the first magnetic detection element 104 and the second magnetic detection element 105 in the rotation direction of the gear 200. That is, the detection unit 103 has four elements.

The signal processing unit 120 acquires the main signal S10 (i.e., S10=2B−A−R) based on the detection results of the first magnetic detection element 104, the second magnetic detection element 105, and the fifth magnetic detection element 131. Therefore, the signal processing unit 120 acquires the sub signal S11 having a phase with respect to the main signal S10 as the rotation mode information of the gear 200 based on the detection results of the fourth magnetic detection element 130 and the fifth magnetic detection element 131. The sub signal S11 has a value of S11=L−R. That is, the sub signal S11 is a differential signal between the fourth detection signal L and the fifth detection signal R.

The process of the control unit 123 for acquiring the position signal and the phase signal and the process of determining the rotation direction of the gear 200 are the same as those of the second embodiment. Moreover, the same effect as that of the first and second embodiments can be obtained. As described above, the rotation position and the rotation direction of the gear 200 can be acquired even with the four elements. Note that S11 may be the main signal and S10 may be the sub signal.

Figure 18:
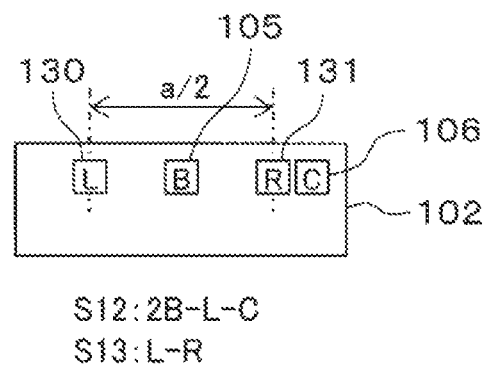
FIG. 18 is a diagram showing a modified example of the arrangement of each magnetic detection element according to the sixth embodiment.

As a modification, as shown in FIG. 18, the detection unit 103 may have the second magnetic detection element 105 and the third magnetic detection element 106. The fifth magnetic detection element 131 is arranged between the second magnetic detection element 105 and the third magnetic detection element 106 in the rotation direction of the gear 200.

In this case, the signal processing unit 120 acquires the main signal S12 (i.e., S12=2B−L−C) based on the detection results of the second magnetic detection element 105, the third magnetic detection element 106, and the fourth magnetic detection element 130. Further, the signal processing unit 120 acquires the value of L−R as the sub signal S13 based on the detection results of the fourth magnetic detection element 130 and the fifth magnetic detection element 131. That is, the sub signal S13 is a differential signal between the fourth detection signal L and the fifth detection signal R. As described above, the second magnetic detection element 105 and the third magnetic detection element 106 may be adopted. Note that S13 may be the main signal and S12 may be the sub signal.

The first magnetic detection element 104 of the present embodiment corresponds to the third magnetic element. The second magnetic detection element 105 of the present embodiment corresponds to the third magnetic element or the fourth magnetic element. The third magnetic detection element 106 of the present embodiment corresponds to the fourth magnetic element. The main signals S10 and S12 of the present embodiment correspond to signals having a phase with respect to the differential signals, respectively. When S11 and S13 of this embodiment are used as main signals, the main signals S11 and S13 correspond to differential signals.

Seventh Embodiment

Figure 19:
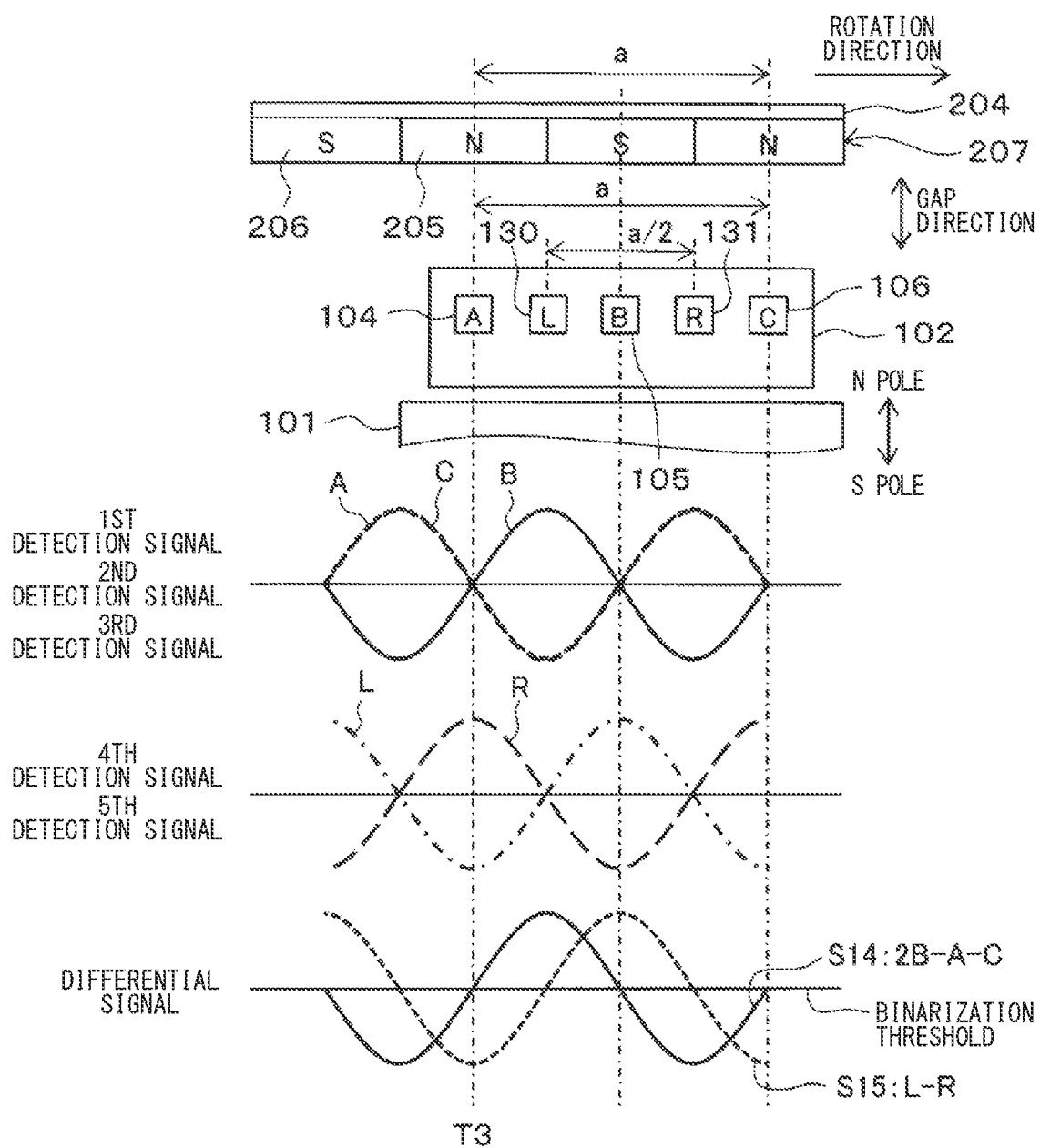
FIG. 19 is a diagram showing an arrangement relationship between a rotation detection device and a magnetization rotor and each signal according to the seventh embodiment.

In the present embodiment, portions different from the respective embodiments described above will be described. As shown in FIG. 19, in the present embodiment, the rotating body as a detection target is the magnetizing rotor 204. The magnetizing rotor 204 has a first magnetic pole 205 and a second magnetic pole 206. The first magnetic pole 205 is the north pole. The second magnetic pole 206 is the S pole. The magnetizing rotor 204 is a disk-shaped rotating body in which N poles and S poles are alternately magnetized in the circumferential direction of the outer peripheral portion 207.

Note that FIG. 19 shows a part of the outer peripheral portion 201 of the magnetizing rotor 204 developed in a straight line. Further, the first magnetic pole 205 may be the S pole and the second magnetic pole 206 may be the N pole.

The constant interval a is the length from the center position of the first magnetic pole 205 in the rotation direction of the magnetizing rotor 204 to the center position of the next first magnetic pole 205. The constant interval a may be the length from the center position of the second magnetic pole 206 to the center position of the next second magnetic pole 206. Alternatively, the constant interval a may be the length from the boundary between the first magnetic pole 205 and the second magnetic pole 206 to the boundary between the next first magnetic pole 205 and the second magnetic pole 206.

Therefore, the first magnetic detection element 104 and the third magnetic detection element 106 are arranged with an interval of a. Similarly, the fourth magnetic detection element 130 and the fifth magnetic detection element 131 are arranged with an interval of a/2. The arrangement of the elements 104 to 106, 130, and 131 is the same as that of the second embodiment.

A GMR element (Giant Magneto Resistance; GMR) is used as each of the elements 104 to 106, 130, and 131. Each element 104 to 106, 130, 131 may be a TMR element (Tunneling Magneto Resistance; TMR) or an AMR element (Anisotropic Magneto Resistance; AMR).

The entire sensor chip 102 is located outside the bias magnet 101. That is, the sensor chip 102 is located between the outer peripheral portion 207 of the magnetizing rotor 204 and the bias magnet 101. The north pole side of the bias magnet 101 is directed toward the outer peripheral portion 207 side of the magnetizing rotor 204. The bias magnet 101 may have the S pole side directed toward the outer peripheral portion 207 side of the magnetizing rotor 204.

In the rotation direction of the magnetizing rotor 204, the first detection signal A and the third detection signal C have the maximum amplitude at the boundary where the first magnetic pole 205 is switched to the second magnetic pole 206. Further, the amplitudes of the first detection signal A and the third detection signal C becomes the minimum value at the boundary where the second magnetic pole 206 is switched to the first magnetic pole 205. The amplitude of the second detection signal B becomes the maximum value at the boundary where the second magnetic pole 206 is switched to the first magnetic pole 205. Further, the amplitude of the second detection signal B becomes the minimum value at the boundary where the first magnetic pole 205 is switched to the second magnetic pole 206.

In the rotation direction of the magnetizing rotor 204, the fourth detection signal L has the maximum amplitude at the center of the width of the second magnetic pole 206. Further, the amplitude of the fourth detection signal L becomes the minimum value at the center of the width of the first magnetic pole 205. The fifth detection signal R has the maximum amplitude at the center of the width of the first magnetic pole 205. The amplitude of the fifth detection signal R becomes the minimum value at the center of the width of the second magnetic pole 206. Further, the fifth detection signal R has the maximum amplitude at the center of the width of the first magnetic pole 205.

The signal processing unit 120 acquires the main signal S14 (i.e., S14=2B−A−C) and the sub-signal S15 (i.e., S15=L−R) as in the second embodiment. Further, the control unit 123 acquires a position signal and a phase signal.

Then, when the rotation direction of the magnetizing rotor 204 is normal, the control unit 123 causes the amplitude of the main signal S14 to be larger than the binarization threshold before and after the time point T3. Thus, the position signal changes from Lo to Hi. Since the signal amplitude of the sub signal S15 is smaller than the binarization threshold, the phase signal that is binarized becomes Lo. Thus, the control unit 123 determines that the magnetizing rotor 204 is in the forward rotation under a condition where the position signal rises from Lo to Hi and the phase signal is Lo. The signal processing unit 120 outputs a rotation mode signal that falls at the time point T3 to an external device as a signal indicating the forward rotation.

When the rotation direction of the magnetizing rotor 204 is in the reverse rotation, the amplitude of the main signal S14 becomes smaller than the binarization threshold around the time point T3. Thus, the position signal changes from Hi to Lo. Since the signal amplitude of the sub signal S15 is smaller than the binarization threshold, the phase signal that is binarized becomes Lo. Thus, the control unit 123 determines that the magnetizing rotor 204 is in the reverse rotation under a condition where the position signal falls from Hi to Lo and the phase signal is Lo. The signal processing unit 120 outputs a rotation mode signal as a signal indicating reverse rotation to an external device, and the signal falls at the time point T3 and has a larger pulse width than in the case of forward rotation.

As described above, the magnetizing rotor 204 may be adopted as the rotating body. Also in this embodiment, the same effect as in the first and second embodiments can be obtained.

Figure 20:
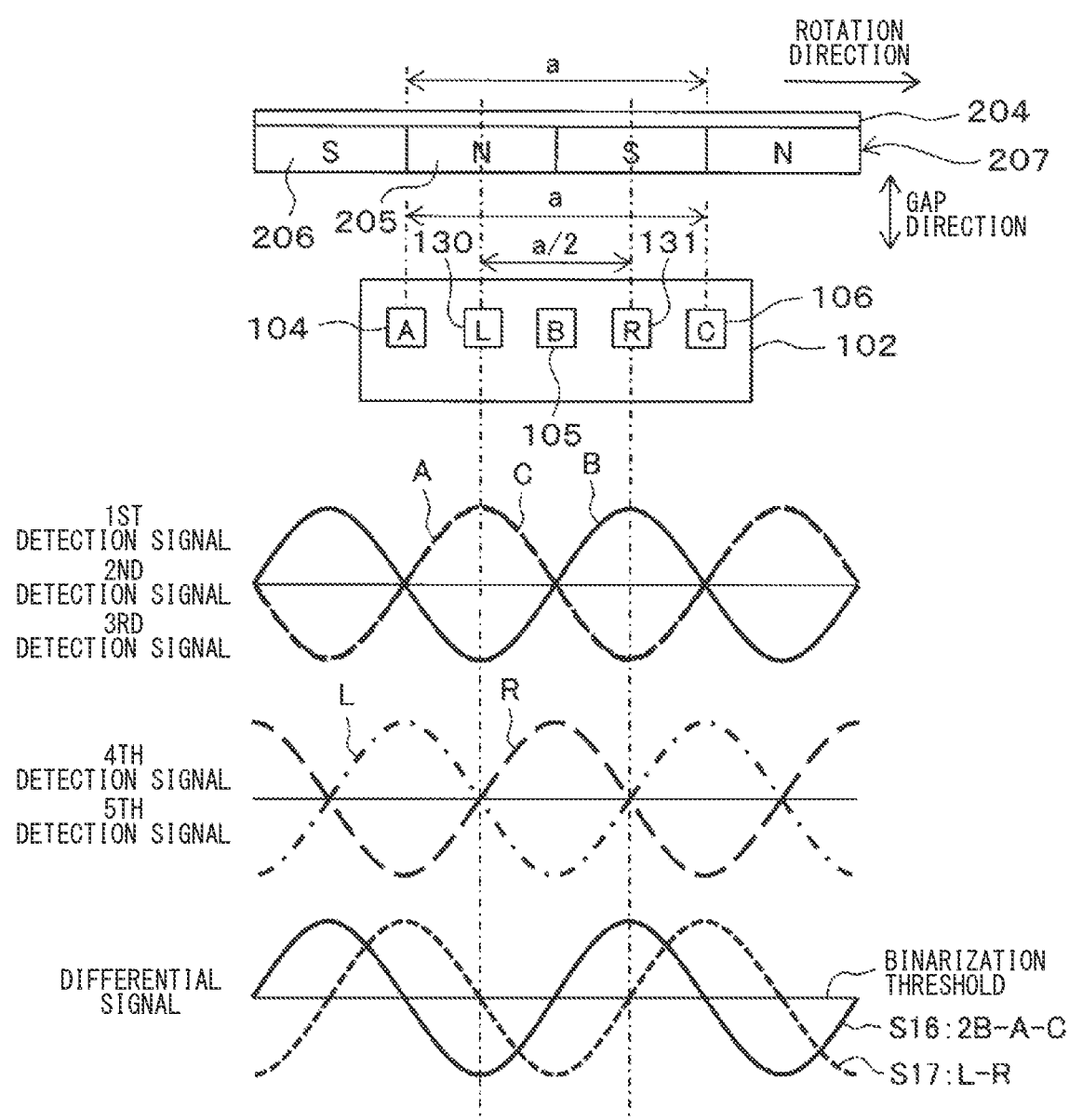
FIG. 20 is a diagram showing a modified example of the rotation detection device according to the seventh embodiment.
Figure 21:
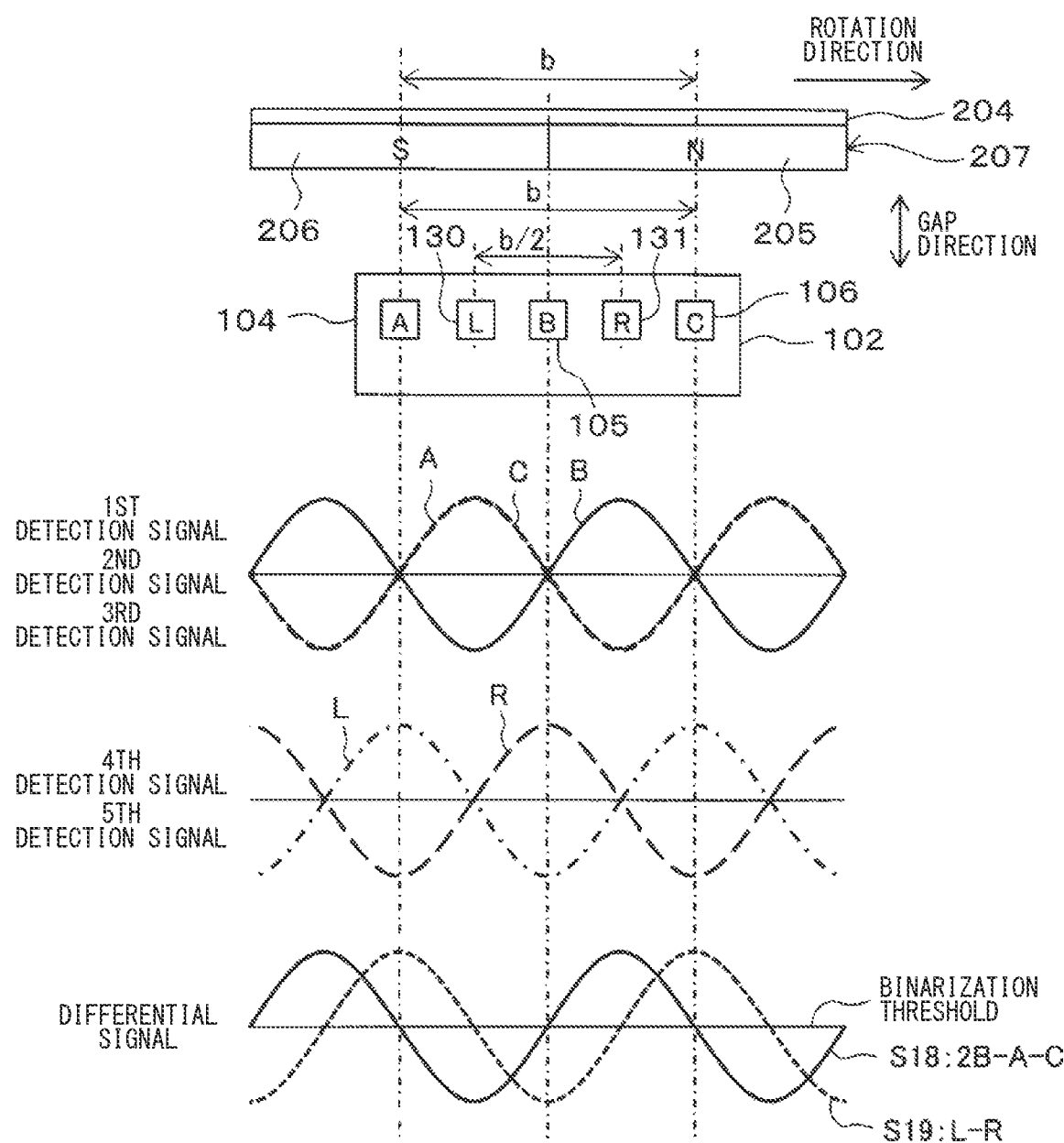
FIG. 21 is a diagram showing a modified example of the rotation detection device according to the seventh embodiment.

As a modification, as shown in FIGS. 20 and 21, the rotation detection device 100 may not include the bias magnet 101. FIG. 20 shows a case where a GMR element or a TMR element is used as each element 104 to 106, 130, 131. In this case, in the rotation direction of the magnetizing rotor 204, the first detection signal A and the third detection signal C have the maximum amplitude at the center of the width of the first magnetic pole 205. The second detection signal B has the maximum amplitude at the center of the width of the second magnetic pole 206. The amplitude of the fourth detection signal L becomes the maximum value at the boundary where the first magnetic pole 205 is switched to the second magnetic pole 206. The signal processing unit 120 acquires the main signal S16 (i.e., S16=2B−A−C) and the sub-signal S17 (i.e., S17=L−R) as in the second embodiment.

FIG. 21 shows a case where an AMR element is used as each element 104 to 106, 130, 131. In this case, the definition of constant intervals is different from the above. Here, a constant interval is defined as b. The constant interval b is the length between the width center of the first magnetic pole 205 and the width center of the second magnetic pole 206 in the rotation direction of the magnetizing rotor 204. The first magnetic detection element 104 and the third magnetic detection element 106 are arranged at intervals of b. Similarly, the fourth magnetic detection element 130 and the fifth magnetic detection element 131 are arranged with an interval of b/2. In this case, in the rotation direction of the magnetizing rotor 204, the first detection signal A and the third detection signal C have the maximum amplitude at the center of the width of the second magnetic pole 206. The amplitude of the second detection signal B becomes zero at the boundary between the first magnetic pole 205 and the second magnetic pole 206. The fourth detection signal L has the maximum amplitude at the center of the width of the second magnetic pole 206. The amplitude of the fifth detection signal R has the maximum value at the boundary between the first magnetic pole 205 and the second magnetic pole 206. The signal processing unit 120 acquires the main signal S18 (i.e., S18=2B−A−C) and the sub-signal S19 (i.e., S19=L−R) as in the second embodiment.

The magnetizing rotor 204 of this embodiment corresponds to a rotating body. The main signals S14 and S16 of this embodiment correspond to differential signals. The sub signals S15 and S17 of the present embodiment correspond to signals having a phase with respect to the differential signals, respectively.

Eighth Embodiment

Figure 22:
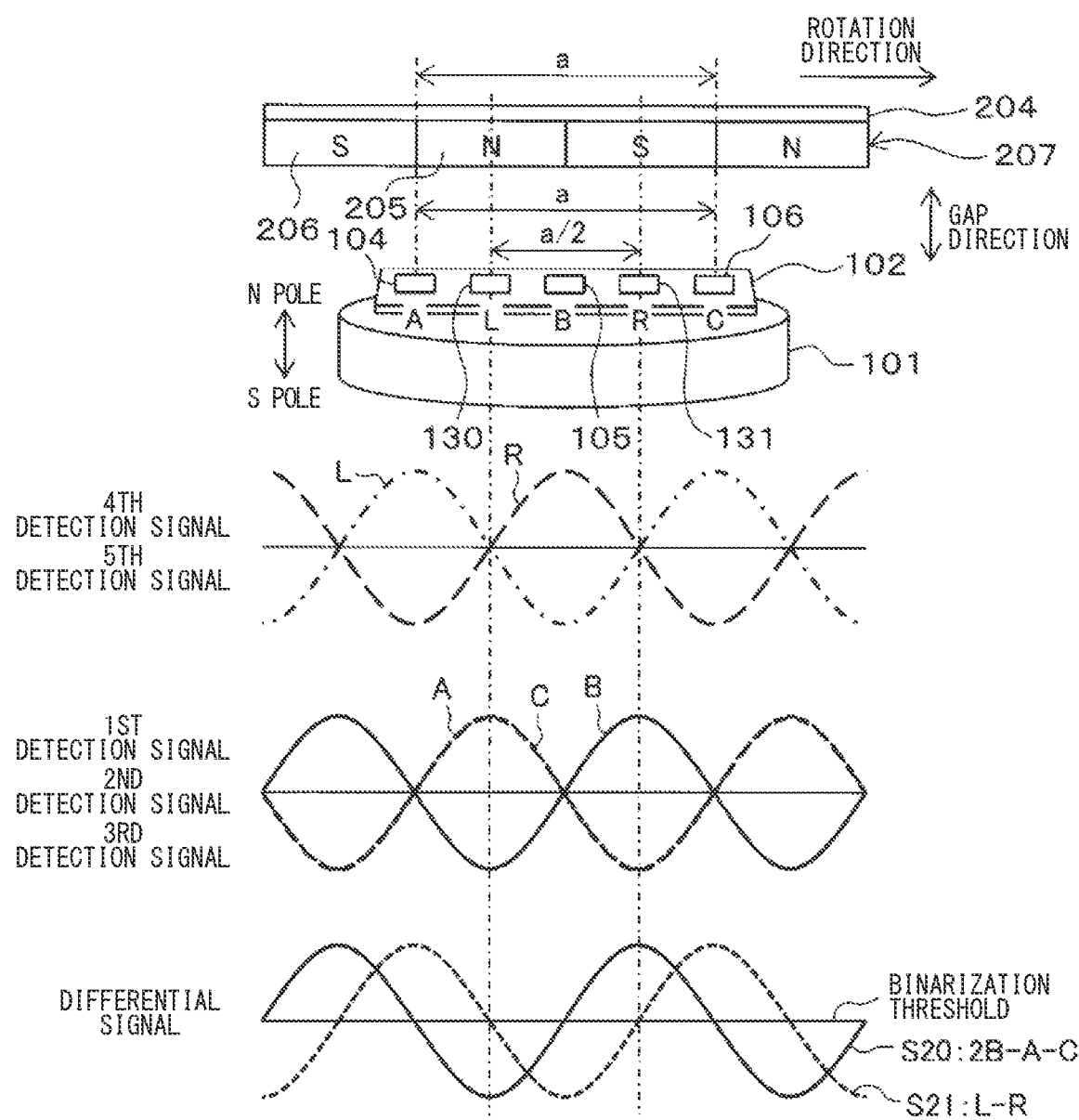
FIG. 22 is a diagram showing an arrangement relationship between a rotation detection device and a magnetization rotor and each signal according to the eighth embodiment.

In the present embodiment, portions different from those of the seventh embodiment will be mainly described. As shown in FIG. 22, the detection unit 103 employs a magnetic detection method using a Hall element, as in the third embodiment.

In this embodiment, in the rotation direction of the magnetizing rotor 204, the first detection signal A and the third detection signal C have the maximum amplitude at the center of the width of the first magnetic pole 205. Further, the first detection signal A and the third detection signal C have the minimum amplitude at the center of the width of the second magnetic pole 206. The second detection signal B has the maximum amplitude at the center of the width of the second magnetic pole 206. Further, the amplitude of the second detection signal B becomes the minimum value at the center of the width of the first magnetic pole 205.

In the rotation direction of the magnetizing rotor 204, the amplitude of the fourth detection signal L becomes maximum at the boundary where the first magnetic pole 205 is switched to the second magnetic pole 206. Further, the amplitude of the fourth detection signal L becomes the minimum value at the boundary where the second magnetic pole 206 is switched to the first magnetic pole 205. The amplitude of the fifth detection signal R becomes the maximum value at the boundary where the second magnetic pole 206 is switched to the first magnetic pole 205. Further, the amplitude of the fifth detection signal R becomes the minimum value at the boundary where the first magnetic pole 205 is switched to the second magnetic pole 206.

The signal processing unit 120 acquires the main signal S20 (i.e., S20=2B−A−C) and the sub-signal S21 (i.e., S21=L−R) as in the second embodiment. Further, the process of the control unit 123 for acquiring the position signal and the phase signal and the process of determining the rotation direction of the magnetizing rotor 204 are the same as those of the second embodiment. Moreover, the same effect as that of the first and second embodiments can be obtained. As described above, the Hall element may be adopted.

Figure 23:
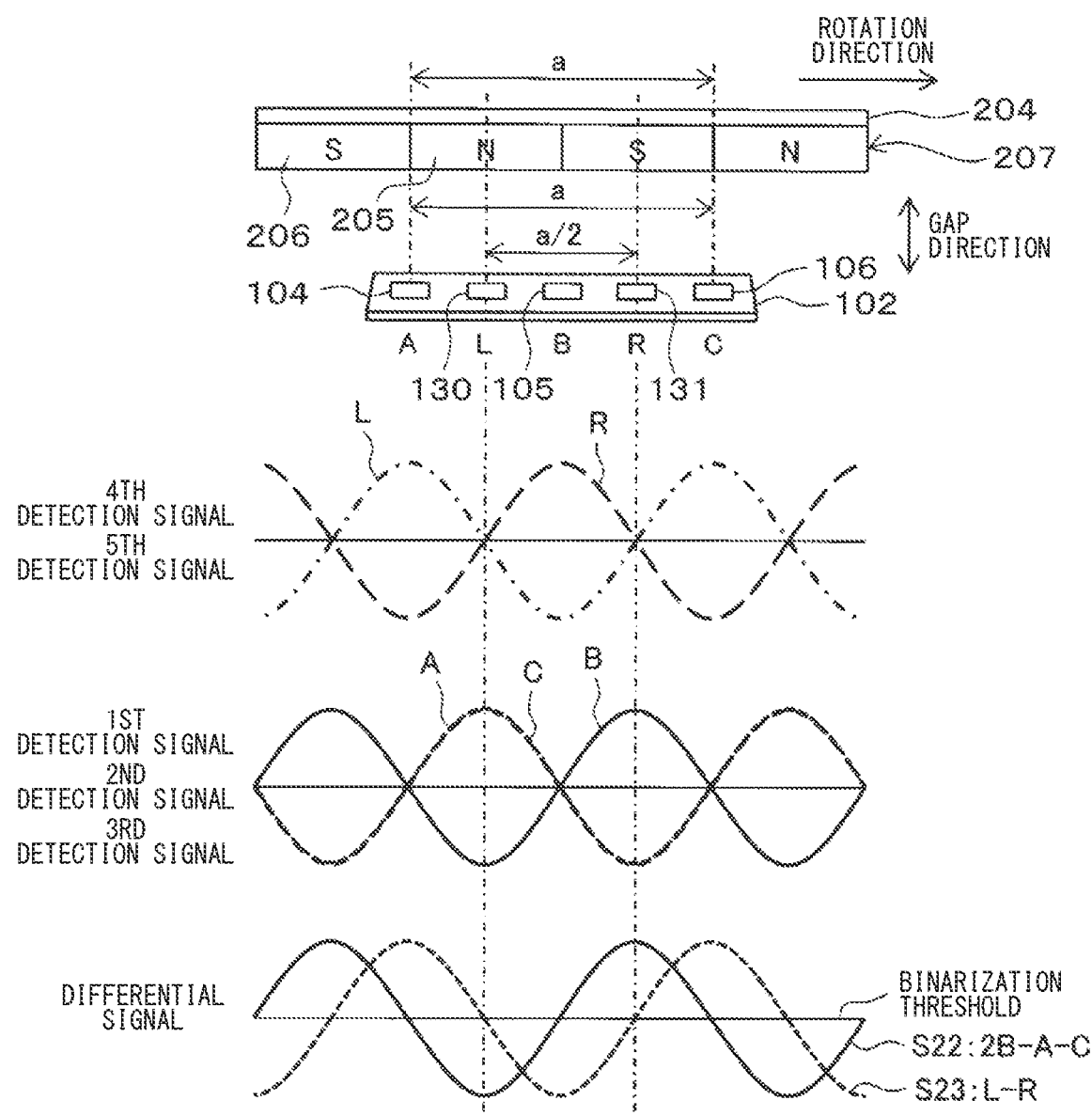
FIG. 23 is a diagram showing a modified example of the rotation detection device according to the eighth embodiment.

As a modification, as shown in FIG. 23, the rotation detection device 100 may not include the bias magnet 101.

The main signals S20 and S22 of this embodiment correspond to differential signals. The sub signals S21 and S23 of the present embodiment correspond to signals having a phase with respect to the differential signals, respectively.

The present disclosure is not limited to the embodiments described above, and various modifications can be made as follows within a range not departing from the spirit of the present disclosure.

For example, the gear 200 and the magnetizing rotor 204 may be provided with a portion indicating a rotation reference position.

Even when the rotating body is the magnetizing rotor 204, two elements may be adopted as in the fifth embodiment. Of course, as in the first embodiment, three elements may be adopted. Further, as in the sixth embodiment, four elements may be adopted.

The rotation detection device 100 is not limited to the gear and the magnetizing rotor incorporated in the transmission of the vehicle, and may be used for the rotation of other parts of the vehicle and the detection of a rotating body other than the vehicle.

Although the present disclosure has been described in accordance with the examples, it is understood that the disclosure is not limited to such examples or structures. The present disclosure also includes various modifications and modifications within an equivalent range. In addition, various combinations and forms, and other combinations and forms including only one element, more, or less than them are also included in the scope and concept of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotation detection device comprising:
a detector that is arranged with a predetermined gap with respect to an outer peripheral portion of a rotating body in which rotation position information is periodically provided on the outer peripheral portion at regular intervals, and detects a magnetic change received from the outer peripheral portion as a rotation position of the rotating body changes according to a rotation of the rotating body; and
a signal processor that acquires the rotation position information of the rotating body based on a detection result of the detector,
wherein:
the detector has a first magnetic element and a second magnetic element;
each regular interval is defined as a;
the first magnetic element and the second magnetic element are arranged with an interval of a/2 in a rotation direction of the rotating body;
the first magnetic element outputs a first signal having a period corresponding to the regular intervals;
the second magnetic element outputs a second signal having an opposite phase to the first signal and the period corresponding to the regular intervals;
the signal processor acquires a differential signal between the first signal and the second signal as the rotation position information having the period corresponding to the regular intervals;
the detector has a third magnetic element and a fourth magnetic element;
the third magnetic element and the fourth magnetic element are arranged so as to sandwich the first magnetic element in the rotation direction of the rotating body; and
the signal processor acquires a signal having a phase with respect to the differential signal based on detection results of the second magnetic element, the third magnetic element and the fourth magnetic element, as rotation mode information of the rotating body.

2. The rotation detection device according to claim 1, wherein:
in the first magnetic element and the second magnetic element, a center position of the first magnetic element and a center position of the second magnetic element in the rotation direction of the rotating body are arranged with an interval of a/2.

3. The rotation detection device according to claim 1, wherein:
the signal processor determines whether the rotation direction of the rotating body is forward rotation or reverse rotation, based on the rotation position information and the rotation mode information.

4. The rotation detection device according to claim 1, wherein:
the rotating body is a gear in which a convex portion and a concave portion are alternately provided on the outer peripheral portion along the rotation direction of the rotating body; and
each regular interval is a gear pitch of the gear.

5. The rotation detection device according to claim 1, wherein:

the rotating body is a magnetizing rotor in which a first magnetic pole and a second magnetic pole are alternately provided along the rotation direction of the rotating body; and
each regular interval is a length between a center position of the first magnetic pole and a center position of an adjacent first magnetic pole, a length between a center position of the second magnetic pole and a center of an adjacent second magnetic pole, or a length between a boundary between the first magnetic pole and the second magnetic pole and an adjacent boundary between the first magnetic pole and the second magnetic pole, in the rotation direction of the magnetizing rotor.

6. The rotation detection device according to claim 1, wherein:
each of the first magnetic element, the second magnetic element, the third magnetic element, and the fourth magnetic element includes a pair of magnetoresistive elements having a resistance that changes with the rotation of the rotating body;
the detector includes a bias magnet that applies a bias magnetic field to the pair of the magnetoresistive elements; and
the second magnetic element is arranged at a position spaced apart from an outer peripheral portion of the rotating body further than the first magnetic element, the third magnetic element, and the fourth magnetic element.

7. A rotation detection device comprising:
a detector that is arranged with a predetermined gap with respect to an outer peripheral portion of a rotating body in which rotation position information is periodically provided on the outer peripheral portion at regular intervals, and detects a magnetic change received from the outer peripheral portion as a rotation position of the rotating body changes according to a rotation of the rotating body; and
a signal processor that acquires the rotation position information of the rotating body based on a detection result of the detector,
wherein:
the detector has a first magnetic element and a second magnetic element;
each regular interval is defined as a;
the first magnetic element and the second magnetic element are arranged with an interval of a/2 in a rotation direction of the rotating body;
the first magnetic element outputs a first signal having a period corresponding to the regular intervals;
the second magnetic element outputs a second signal having an opposite phase to the first signal and the period corresponding to the regular intervals;
the signal processor acquires a differential signal between the first signal and the second signal as the rotation position information having the period corresponding to the regular intervals;
the detector has a third magnetic element and a fourth magnetic element;
the third magnetic element and the fourth magnetic element are arranged so as to sandwich the second magnetic element in the rotation direction of the rotating body; and
the signal processor acquires a signal having a phase with respect to the differential signal based on detection results of the first magnetic element, the third magnetic element and the fourth magnetic element, as rotation mode information of the rotating body.

8. The rotation detection device according to claim 7, wherein:
in the first magnetic element and the second magnetic element, a center position of the first magnetic element and a center position of the second magnetic element in the rotation direction of the rotating body are arranged with an interval of a/2.

9. The rotation detection device according to claim 7, wherein:
each of the first magnetic element, the second magnetic element, the third magnetic element, and the fourth magnetic element includes a pair of magnetoresistive elements having a resistance that changes with the rotation of the rotating body;
the detector includes a bias magnet that applies a bias magnetic field to the pair of the magnetoresistive elements; and
the second magnetic element is arranged at a position spaced apart from an outer peripheral portion of the rotating body further than the first magnetic element, the third magnetic element, and the fourth magnetic element.

10. The rotation detection device according to claim 7, wherein:
the rotating body is a gear in which a convex portion and a concave portion are alternately provided on the outer peripheral portion along the rotation direction of the rotating body; and
each regular interval is a gear pitch of the gear.

11. The rotation detection device according to claim 7, wherein:
the rotating body is a magnetizing rotor in which a first magnetic pole and a second magnetic pole are alternately provided along the rotation direction of the rotating body; and
each regular interval is a length between a center position of the first magnetic pole and a center position of an adjacent first magnetic pole, a length between a center position of the second magnetic pole and a center of an adjacent second magnetic pole, or a length between a boundary between the first magnetic pole and the second magnetic pole and an adjacent boundary between the first magnetic pole and the second magnetic pole, in the rotation direction of the magnetizing rotor.

12. A rotation detection device comprising:
a detector that is arranged with a predetermined gap with respect to an outer peripheral portion of a rotating body in which rotation position information is periodically provided on the outer peripheral portion at regular intervals, and detects a magnetic change received from the outer peripheral portion as a rotation position of the rotating body changes according to a rotation of the rotating body; and
a signal processor that acquires the rotation position information of the rotating body based on a detection result of the detector, wherein:
the detector includes a first magnetic element, a second magnetic element, and a third magnetic element;
each regular interval is defined as a;
the first magnetic element and the third magnetic element are arranged with an interval of a in the rotation direction of the rotating body;
the first magnetic element outputs a first signal;
the third magnetic element outputs a third signal having a same phase as the first signal;
the second magnetic element is arranged between the first magnetic element and the third magnetic element in the rotation direction of the rotating body, and outputs a second signal having a phase with respect to the first signal and the third signal and a same period as the rotation position information;
the signal processor acquires a differential signal between a first calculation signal and a second calculation signal as the rotation position information having the period corresponding to the regular intervals;
the first calculation signal has a same period as the second signal based on the second signal; and
the second calculation signal has a phase with respect to the first calculation signal based on the first signal and the third signal.

13. The rotation detection device according to claim 12, wherein:
the second magnetic element is arranged at an intermediate position between the first magnetic element and the third magnetic element in the rotation direction of the rotating body.

14. The rotation detection device according to claim 12, wherein:
the detector has a fourth magnetic element and a fifth magnetic element;
the fourth magnetic element and the fifth magnetic element are arranged between the first magnetic element and the third magnetic element in the rotation direction of the rotating body with an interval of a/2;
the second magnetic element is arranged between the fourth magnetic element and the fifth magnetic element in the rotation direction of the rotating body; and
the signal processor acquires a signal having a phase with respect to the differential signal based on detection results of the fourth magnetic element and the fifth magnetic element, as rotation mode information of the rotating body.

15. The rotation detection device according to claim 14, wherein:
each of the first magnetic element, the second magnetic element, the third magnetic element, the fourth magnetic element, and the fifth magnetic element includes a pair of magnetoresistive elements having a resistance that changes with the rotation of the rotating body;
the detector includes a bias magnet that applies a bias magnetic field to the pair of the magnetoresistive elements; and
the second magnetic element is arranged at a position spaced apart from an outer peripheral portion of the rotating body further than the first magnetic element, the third magnetic element, the fourth magnetic element, and the fifth magnetic element.

16. The rotation detection device according to claim 14, wherein:
in the fourth magnetic element and the fifth magnetic element, a center position of the fourth magnetic element and a center position of the fifth magnetic element in the rotation direction of the rotating body are arranged with an interval of a/2.

17. The rotation detection device according to claim 12, wherein:
the detector includes a fourth magnetic element;
the fourth magnetic element is arranged between the second magnetic element and the third magnetic element in the rotation direction of the rotating body; and the signal processor acquires a signal having a phase with respect to the differential signal based on detection results of the first magnetic element and the fourth magnetic element, as rotation mode information of the rotating body.

18. The rotation detection device according to claim 12, wherein:
the detector includes a fourth magnetic element;
the fourth magnetic element is arranged between the first magnetic element and the second magnetic element in the rotation direction of the rotating body; and
the signal processor acquires a signal having a phase with respect to the differential signal based on detection results of the third magnetic element and the fourth magnetic element, as rotation mode information of the rotating body.

19. The rotation detection device according to claim 12, wherein:
in the first magnetic element and the third magnetic element, a center position of the first magnetic element and a center position of the third magnetic element in the rotation direction of the rotating body are arranged with an interval of a.

20. The rotation detection device according to claim 12, wherein:
the rotating body is a gear in which a convex portion and a concave portion are alternately provided on the outer peripheral portion along the rotation direction of the rotating body; and
each regular interval is a gear pitch of the gear.

21. The rotation detection device according to claim 12, wherein:
the rotating body is a magnetizing rotor in which a first magnetic pole and a second magnetic pole are alternately provided along the rotation direction of the rotating body; and
each regular interval is a length between a center position of the first magnetic pole and a center position of an adjacent first magnetic pole, a length between a center position of the second magnetic pole and a center of an adjacent second magnetic pole, or a length between a boundary between the first magnetic pole and the second magnetic pole and an adjacent boundary between the first magnetic pole and the second magnetic pole, in the rotation direction of the magnetizing rotor.

* * * * *